(12) United States Patent
You et al.

(10) Patent No.: US 9,609,647 B2
(45) Date of Patent: Mar. 28, 2017

(54) METHOD FOR RECEIVING DOWNLINK SIGNAL, AND USER DEVICE; AND METHOD FOR TRANSMITTING DOWNLINK SIGNAL, AND BASE STATION

(71) Applicant: LG ELECTRONICS INC., Seoul (KR)

(72) Inventors: Hyangsun You, Anyang-si (KR); Joonkui Ahn, Anyang-si (KR); Inkwon Seo, Anyang-si (KR); Yunjung Yi, Anyang-si (KR); Hanbyul Seo, Anyang-si (KR); Bonghoe Kim, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 14/423,948

(22) PCT Filed: Sep. 25, 2013

(86) PCT No.: PCT/KR2013/008566
§ 371 (c)(1),
(2) Date: Feb. 25, 2015

(87) PCT Pub. No.: WO2014/051322
PCT Pub. Date: Apr. 3, 2014

(65) Prior Publication Data
US 2015/0230211 A1    Aug. 13, 2015

Related U.S. Application Data

(60) Provisional application No. 61/705,152, filed on Sep. 25, 2012, provisional application No. 61/732,867, (Continued)

(51) Int. Cl.
*H04W 72/04* (2009.01)
*H04W 72/12* (2009.01)
(Continued)

(52) U.S. Cl.
CPC .......... *H04W 72/044* (2013.01); *H04L 5/0005* (2013.01); *H04L 5/0051* (2013.01);
(Continued)

(58) Field of Classification Search
CPC ....... H04L 5/00; H04L 5/0001; H04L 5/0005; H04L 5/0007; H04L 5/003; H04L 5/0032;
(Continued)

(56) References Cited

U.S. PATENT DOCUMENTS

2012/0106501 A1*   5/2012   Kishiyama ............ H04L 1/0026
                                                                                                   370/330
2012/0188988 A1    7/2012   Chung et al.
(Continued)

OTHER PUBLICATIONS

KDDI Corp., "Remaining aspects of DMRS for ePDCCH", R1-123242, 3gpp TSG RAN WG1 Meeting #70, Qingdao, China, Aug. 13-17, 2012, (http://www.3gpp.org/ftp/tsg_ran/WG1_RL1/TSGR1_70/Docs/R1-123242.zip) See pp. 1-3; and figures 1, 2.
(Continued)

*Primary Examiner* — Ashley Shivers
(74) *Attorney, Agent, or Firm* — Dentons US LLP

(57) ABSTRACT

In the present invention, a demodulation reference signal is transmitted using a plurality of settings in which demodulation reference signals occupy different positions in at least a density or time-frequency resource region of the demodulation reference signals. A base station can transmit, to the user device, information indicating a setting related to a downlink signal or a setting related to an uplink signal from among the plurality of settings, and the user device can receive the demodulation reference signal with the downlink signal or transmit the demodulation reference signal With the uplink signal according to the indicated setting.

8 Claims, 17 Drawing Sheets

(a)

(b)

Related U.S. Application Data filed on Dec. 3, 2012, provisional application No. 61/769,132, filed on Feb. 25, 2013, provisional application No. 61/812,209, filed on Apr. 15, 2013.

(51) Int. Cl.
  *H04L 5/00* (2006.01)
  *H04W 28/18* (2009.01)
  *H04W 48/00* (2009.01)

(52) U.S. Cl.
  CPC .......... *H04W 28/18* (2013.01); *H04W 48/00* (2013.01); *H04W 72/04* (2013.01); *H04W 72/042* (2013.01); *H04W 72/0406* (2013.01); *H04W 72/1278* (2013.01); *H04L 5/001* (2013.01); *H04L 5/0007* (2013.01); *H04L 5/0048* (2013.01)

(58) Field of Classification Search
  CPC ... H04L 5/0033; H04L 5/0035; H04L 5/0039; H04L 5/0041; H04L 5/0042; H04W 72/00; H04W 72/04; H04W 72/0406; H04W 72/042; H04W 72/044; H04W 72/0446; H04W 72/0453; H04W 72/048; H04W 72/12; H04W 72/1263; H04W 72/1273; H04W 72/1278; H04W 72/1289; H04W 72/1294; H04W 72/14
  See application file for complete search history.

(56) References Cited

U.S. PATENT DOCUMENTS

| | | | | |
|---|---|---|---|---|
| 2012/0207119 | A1 | 8/2012 | Zhang et al. | |
| 2012/0250642 | A1* | 10/2012 | Qu | H04W 48/12 370/329 |
| 2012/0320846 | A1* | 12/2012 | Papasakellariou | H04W 72/042 370/329 |
| 2013/0265945 | A1* | 10/2013 | He | H04L 27/2657 370/329 |
| 2013/0265955 | A1* | 10/2013 | Kim | H04W 72/04 370/329 |
| 2013/0286967 | A1* | 10/2013 | Ji | H04W 72/0406 370/329 |
| 2014/0219237 | A1* | 8/2014 | Charbit | H04W 72/044 370/330 |

OTHER PUBLICATIONS

Nokia Siemens Networks et al., "Default configuration for CoMP DMRS", Ri-123645, 3GPP TSG RAN WG1 Meeting #70. Qingdao, China, Aug. 13-17, 2012 (http://www.3gpp.org/ftp/tsg_ran/WG1_RL.1/TSGR1_70/Docs/R1-123645.zip) See pp. 1-3.

Nokia et al., "Signaling ePDCCH presence using demodulation reference signals", R1-121286, 3GPP TSG RAN WG1 Meeting #68bis; Jeju, Korea, Mar. 26-30, 2012 (http://www.3gpp.org/ftp/tsg_ran/WG1_RL1/TSGR1_68b/Docs/R1-121286.zip) See pp. 1-4; figures 2, 3.

International Search Report from PCT/KR2013/008566, dated Jan. 20, 2014.

Written Opinion of the ISA from PCT/KR2013/008566, dated Jan. 20, 2014.

* cited by examiner

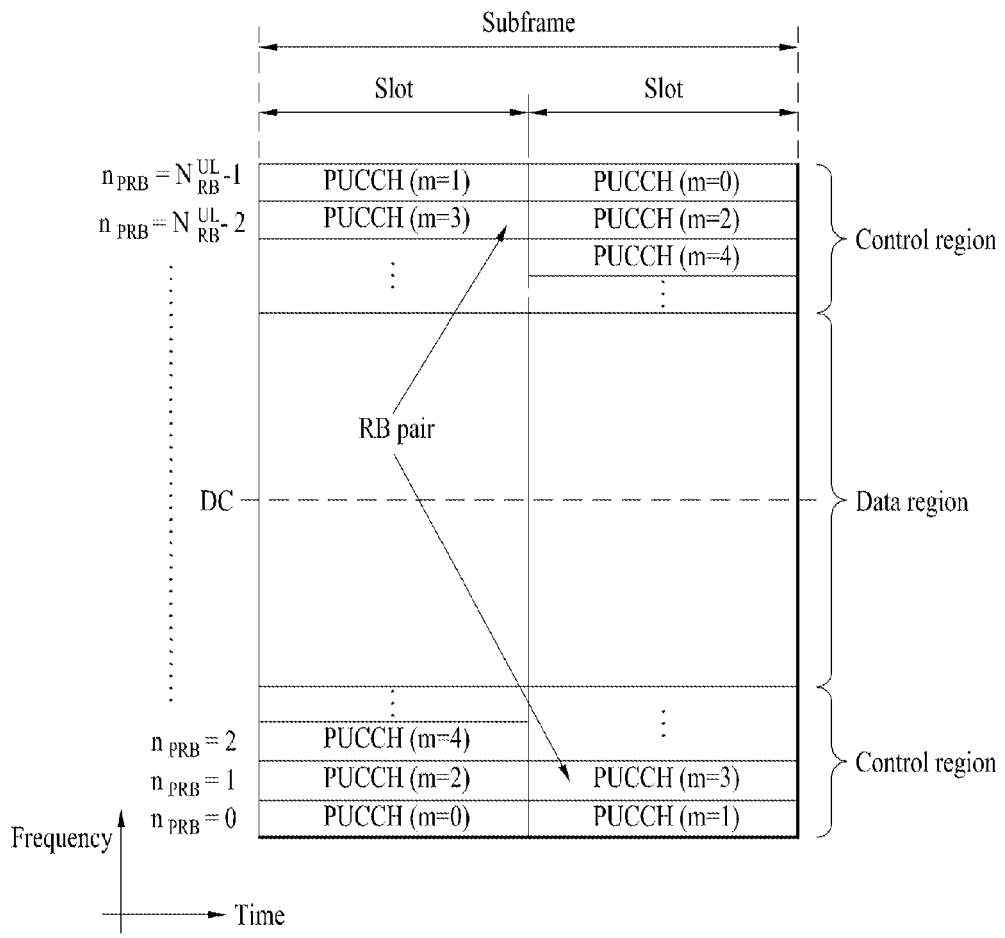
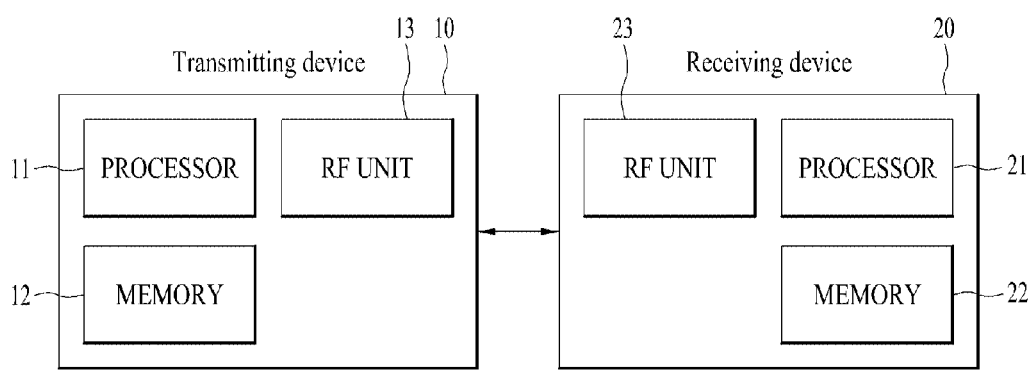

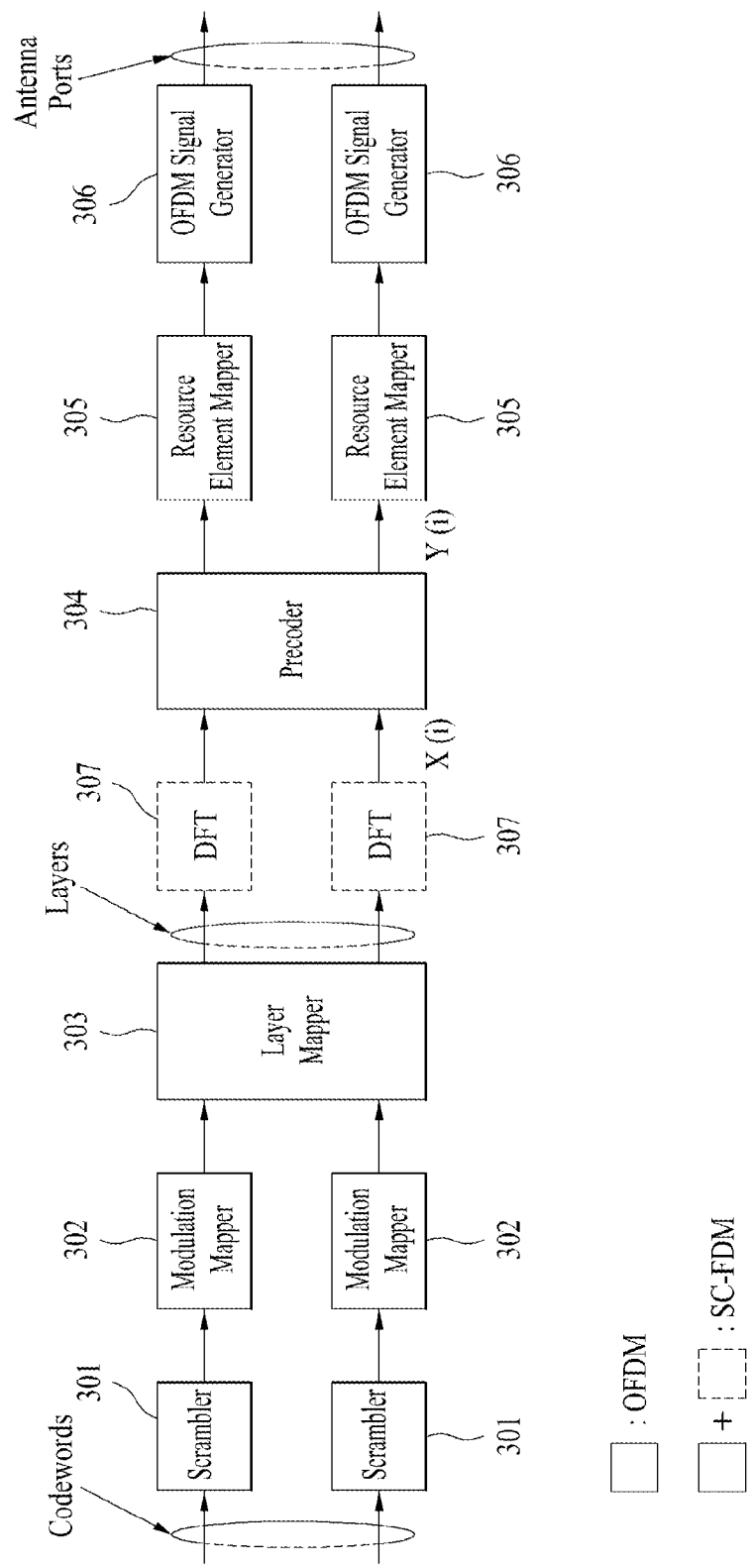

FIG. 16
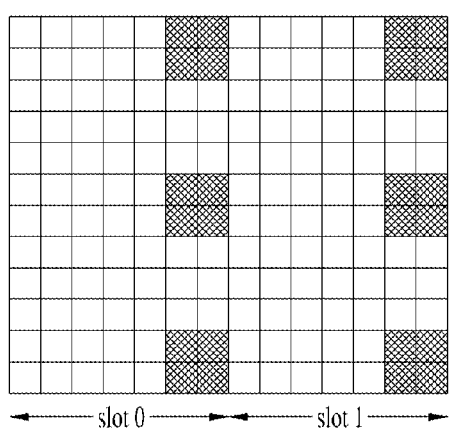
(a)
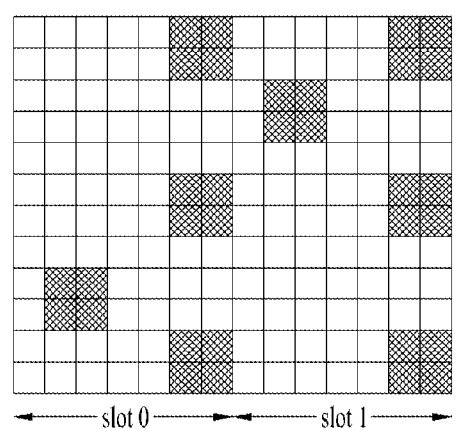
(b)

METHOD FOR RECEIVING DOWNLINK SIGNAL, AND USER DEVICE; AND METHOD FOR TRANSMITTING DOWNLINK SIGNAL, AND BASE STATION

This application is a 35 USC §371 National Stage entry of International Application No. PCT/KR2013/008566 filed on Sep. 25, 2013, and claims priority to U.S. Provisional Application No. 61/705,152 filed on Sep. 25, 2012, 61/732, 867 filed on Dec. 3, 2012, 61/769,132 filed on Feb. 25, 2013, 61/812,209 filed on Apr. 15, 2013, all of which are hereby incorporated by reference in their entireties as if fully set forth herein.

TECHNICAL FIELD

The present invention relates to a wireless communication system and, more particularly, to a method for receiving or transmitting a downlink signal and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of UEs to which a BS should provide a service in a prescribed resource region increases and the amount of data and control information that the BS should transmit to the UEs increases. Since the amount of resources available to the BS for communication with the UE(s) is limited, a new method in which the BS efficiently receives/ transmits uplink/downlink data and/or uplink/downlink control information using the limited radio resources is needed.

In addition, a method for efficiently transmitting/receiving, on a limited radio resource, a reference signal used when a control signal and/or a data signal transmitted by a transmitting device is restored by a receiving device is also demanded.

The technical objects that can be achieved through the present invention are not limited to what has been particularly described hereinabove and other technical objects not described herein will be more clearly understood by persons skilled in the art from the following detailed description.

Technical Solutions

According to the present invention, a demodulation reference signal is transmitted using a plurality of configurations that differ at least in a density of the demodulation reference signal or a location occupied by the demodulation reference signal in the time-frequency resource region. A base station may transmit information indicating a configuration associated with a downlink signal or a configuration associated with an uplink signal among the plurality of configurations to a user equipment. The user equipment may receive the demodulation reference signal together with the downlink signal according to an indicated configuration. The user equipment may transmit the demodulation reference signal together with the uplink signal according to the indicated configuration.

In an aspect of the present invention, provided herein is a method for receiving a downlink signal by a user equipment, including receiving indication information indicating one of a plurality of configurations for transmitting a demodulation reference signal; receiving the demodulation reference signal in a time-frequency resource region to which the downlink signal is mapped according to a configuration indicated by the indication information; and demodulating the downlink signal using the demodulation reference signal.

In another aspect of the present invention, provided herein is a user equipment for receiving a downlink signal, including a radio frequency (RF) unit; and a processor configured to control the RF unit, wherein the processor is configured to control the RF unit to receive indication information indicating one of a plurality of configurations for transmitting a demodulation reference signal; control the RF unit to receive the demodulation reference signal in a time-frequency resource region to which the downlink signal is mapped according to a configuration indicated by the indication information; and demodulate the downlink signal using the demodulation reference signal.

In still another aspect of the present invention, provided herein is a method for transmitting a downlink signal by a base station, including transmitting indication information indicating one of a plurality of configurations for transmitting a demodulation reference signal; and transmitting the demodulation reference signal in a time-frequency resource region to which the downlink signal is mapped according to a configuration indicated by the indication information.

In a further aspect of the present invention, provided herein is a base station for transmitting a downlink signal, including a radio frequency (RF) unit; and a processor configured to control the RF unit, wherein the processor is configured to control the RF unit to transmit indication information indicating one of a plurality of configurations for transmitting a demodulation reference signal; and control the RF unit to transmit the demodulation reference signal in a time-frequency resource region to which the downlink signal is mapped according to a configuration indicated by the indication information, In each aspect of the present invention, the plurality of configurations may differ in a density of the demodulation reference signal or a location occupied by the demodulation reference signal in the time-frequency resource region.

In each aspect of the present invention, the plurality of configurations may include a default configuration, a configuration of a lower density than a density of the default configuration, or a configuration of a higher density than the density of the default configuration. The configuration of the lower density may be defined to include only some resource elements among resource elements of the default configuration. The configuration of the higher density may be defined to include predetermined resource elements added to the resource elements of the default configuration.

In each aspect of the present invention, the time-frequency resource region may include a plurality of physical resource blocks. At least one of the plurality of configurations for transmitting the demodulation reference signal may be defined to include the demodulation reference signal only in some of the plurality of physical resource blocks.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, a reference signal can be efficiently transmitted/received. Therefore, overall throughput of a wireless communication system is improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 5 illustrates the structure of a UL subframe used in a wireless communication system.

FIG. 6 is a block diagram illustrating elements of a transmitting device 10 and a receiving device 20 for implementing the present invention.

FIG. 7 illustrates an overview of physical channel processing.

FIGS. 16(a) and (b) illustrate demodulation reference signal (DMRS) patterns according to an embodiment of the present invention.

MODE FOR CARRYING OUT THE INVENTION

Figure 1:
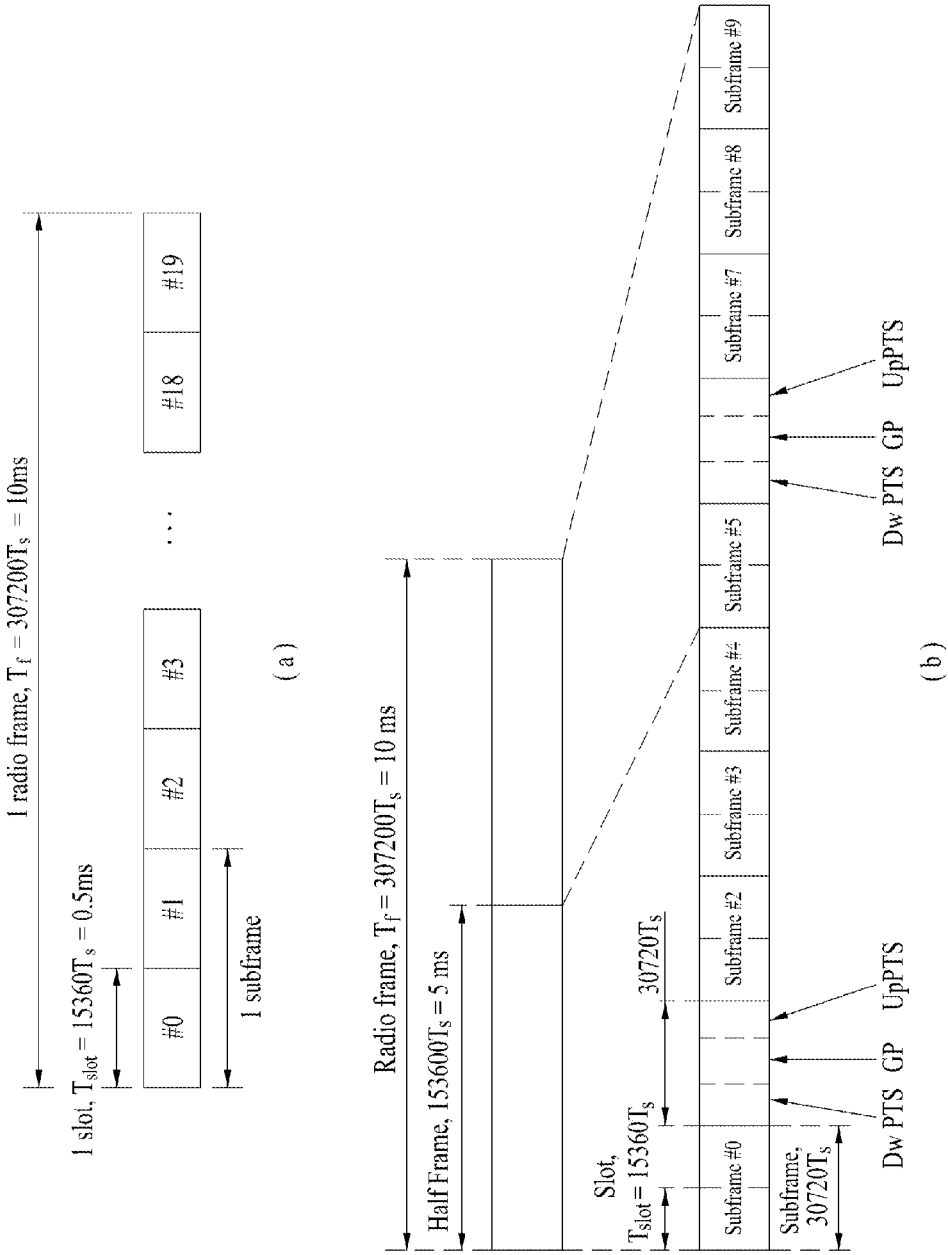
FIGS. 1(a) and (b) illustrate the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plurality of nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described in detail when carrier aggregation is described.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, thus, each of the terms DMRS and UE-RS are used to refer to a demodulation RS.

A detailed description of embodiments of the present invention will be given by referring to a carrier configured according to a legacy radio communication standard as a legacy carrier type (LCT) carrier, an LCT component carrier (CC), an LCT cell, or a normal carrier and by referring to a carrier configured according to less restrictions relative to the LCT carrier as a new carrier type (NCT) carrier, an NCT CC, an NCT cell, or an extended carrier.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
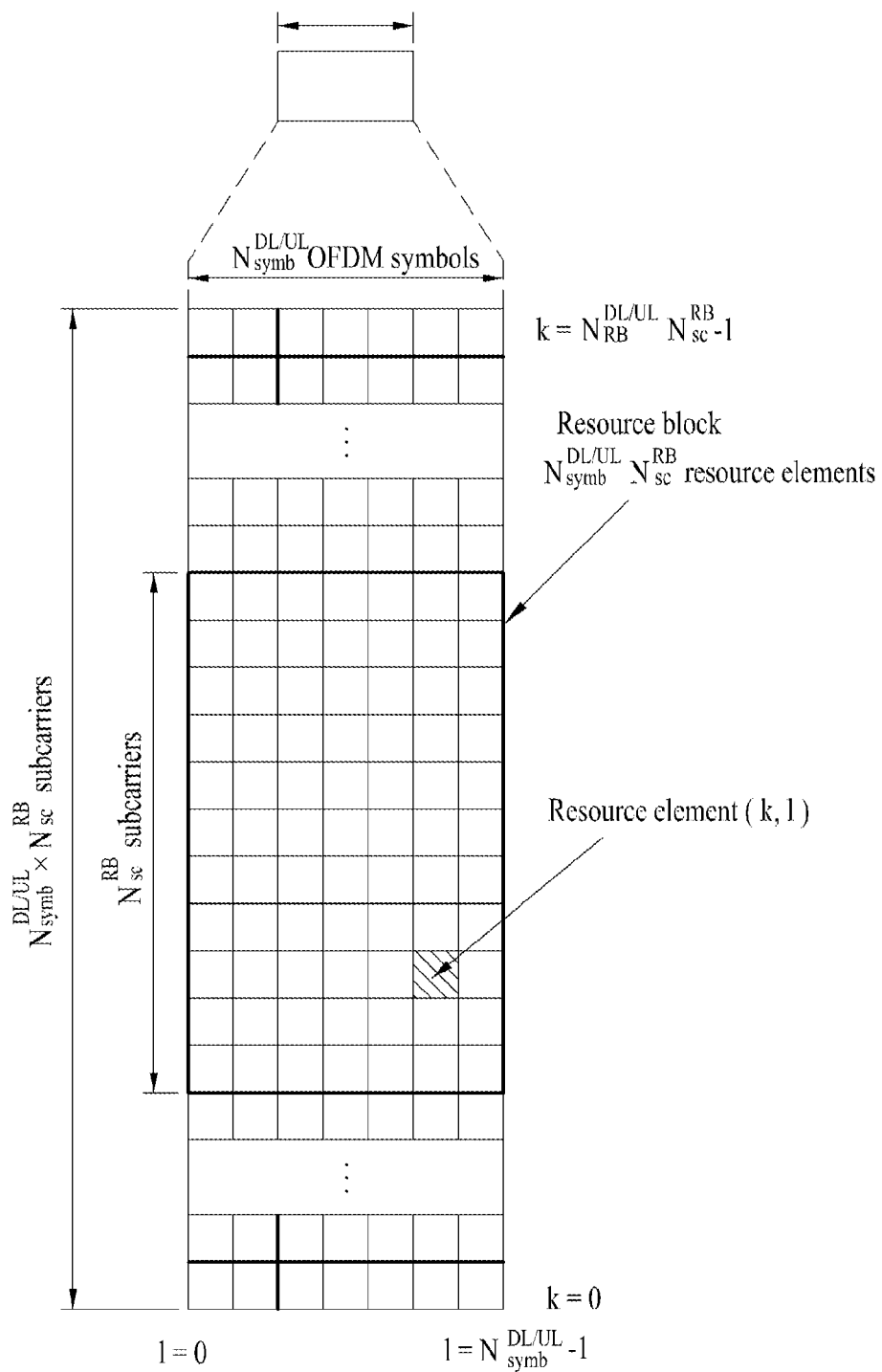
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
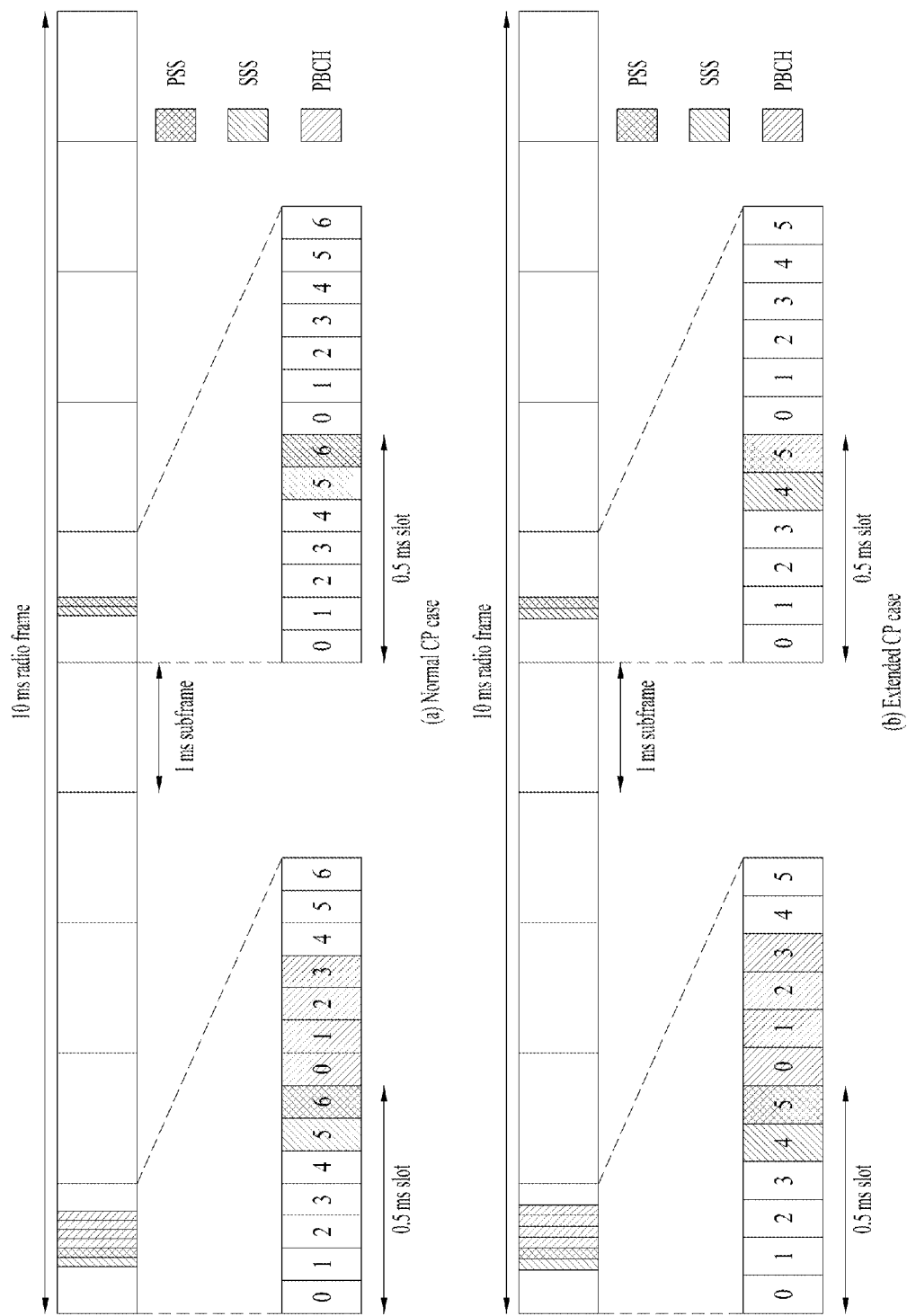
FIGS. 3(a) and (b) illustrate a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}$ ($=3N^{(1)}_{ID}+N^{(2)}_{ID}$) is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}} \quad \text{[Equation 1]}$$

where $N_{ZC}=63$ and a sequence element corresponding to a DC subcarrier, n=31, is punctured.

The PSS is mapped to 6 RBs (=72 subcarriers) near to a center frequency. Among the 72 subcarriers, 9 remaining subcarriers carry a value of always 0 and serve as elements facilitating filter design for performing synchronization. To define a total of three PSSs, u=24, 29, and 34 are used in Equation 1. Since u=24 and u=34 have a conjugate symmetry relationship, two correlations may be simultaneously performed. Here, conjugate symmetry indicates the relationship of the following Equation.

$$d_u(n)=(-1)^n(d_{N_{ZC}-u}(n))^*, \text{when } N_{ZC} \text{ is even number}$$

$$d_u(n)=(d_{N_{ZC}-u}(n))^*, \text{when } N_{ZC} \text{ is odd number} \quad \text{[Equation 2]}$$

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 3]}$$

In Equation 3, the Zadoff-Chu root sequence index u is given by the following table.

TABLE 3

| $N^{(2)}_{ID}$ | Root index u |
|---|---|
| 0 | 25 |
| 1 | 29 |
| 2 | 34 |

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Thus, for cell search/re-search, the UE may receive the PSS and the SSS from the eNB to establish synchronization with the eNB and may acquire information of a cell identity (ID) etc. Next, the UE may receive broadcast information in a cell managed by the eNB over a PBCH.

The message contents of the PBCH are expressed by a master information block (MIB) in a radio resource control (RRC) layer. Specifically, the message contents of the PBCH are shown in Table 4.

TABLE 4

```
-- ASN1START
MasterInformationBlock ::= SEQUENCE {
dl-Bandwidth          ENUMERATED {
                        n6,n15,n25,n50,n75,n100,spare2,spare1},
phich-Configuration   PHICH-Configuration,
systemFrameNumber     BIT STRING (SIZE (8)),
spare                 BIT STRING (SIZE (10)),
}
-- ASN1STOP
```

As shown in Table 4, the MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH. For example, a masking sequence per number of antennas as shown in Table 5 may be used.

TABLE 5

| Number of transmit antenna ports at eNode-B | PBCH CRC mask <$x_{ant,\,0}$, $x_{ant,\,1}$, . . . , $x_{ant,\,15}$> |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

The PBCH is mapped to REs after cell-specific scrambling, modulation, layer mapping, and precoding.

FIG. 3 illustrates exemplary mapping based on one radio frame and, in fact, an encoded PBCH is mapped to 4 subframes during 40 ms. The time of 40 ms is blind-detected and explicit signaling about 40 ms is not separately present. The PBCH is mapped to 4 OFDM symbols and 72 subcarriers in one subframe. The PBCH is not mapped to REs in which RSs for 4 transmit antennas are located regardless of the number of actual transmit antennas of the eNB. For reference, even in the frame structure applied to TDD, illustrated in FIG. 1(b), the PBCH is mapped to 4 subframes during 40 ms and is mapped to 4 OFDM symbols and 72 subcarriers in one subframe. In TDD, the PBCH may be located on the first to fourth OFDM symbols of the first slot (the rear slot of the zeroth subframe) and the 11th slot (the rear slot of the fifth subframe) of a radio frame.

Figure 4:
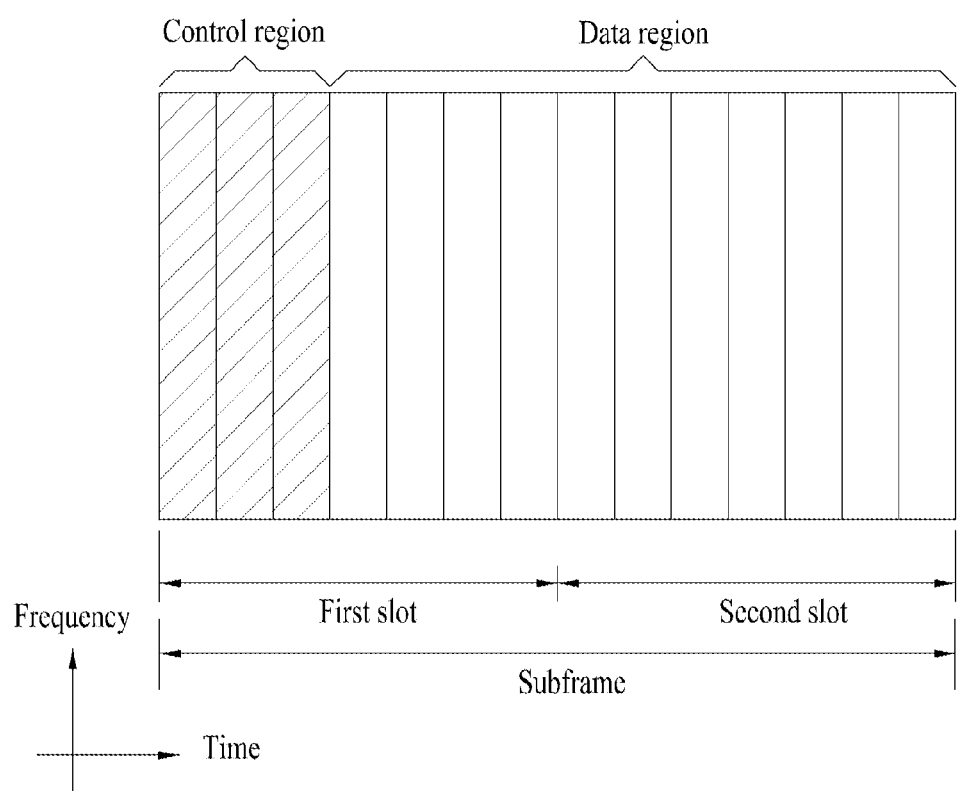
FIG. 4 illustrates the structure of a DL subframe used in a wireless communication system.

FIG. 4 illustrates the structure of a DL subframe used in a wireless communication system.

Referring to 4, A DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. Table 6 illustrates an example of the DCI format.

TABLE 6

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

In Table 6, formats 0 and 4 are DCI formats defined for UL and formats 1, 1A, 1B, 1C, 1D, 2, 2A, 2B, 2C, 3, and 3A are DCI formats defined for DL. Various DCI formats in addition to the formats shown in Table 6 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs).

The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. For example, the PCFICH and PHICH include 4 REGs and 3 REGs, respectively. Assuming that the number of REGs not allocated to the PCFICH or the PHICH is $N_{REG}$, the number of available CCEs in a DL subframe for PDCCH(s) in a system is numbered from 0 to $N_{CCE}-1$ where $N_{CCE}=\text{floor}(N_{REG}/9)$.

A PDCCH format and the number of DCI bits are determined according to the number of CCEs. The following table shows supported PDCCH formats, the number of CCEs per format, and the number of supported DCI bits.

TABLE 7

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are numbered and are consecutively used. To simplify a decoding process, a PDCCH having a format comprised of n CCEs may be started only on a CCE having a number corresponding to a multiple of n. For example, a PDCCH comprised of n consecutive CCEs may be started only on a CCE satisfying 'i mod n=0' where i is a CCE index (or CCE number).

The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS (CSS) are defined. The dedicated SS is a UE-specific SS (USS) and is configured for each individual UE. The common SS is configured for a plurality of UEs. The following table shows aggregation levels for defining SSs.

TABLE 8

| Type | Search space $S_k^{(L)}$ Aggregation level L | Size [in CCEs] | Number of PDCCH candidates $M^{(L)}$ |
| --- | --- | --- | --- |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

For the CSS, $Y_k$ is set to 0 for aggregation levels L=4 and L=8. For the UE SS $S^{(L)}_k$ at aggregation level L, the variable $Y_k$ is defined by the following equation.

$$Y_k = (A \cdot Y_{k-1}) \bmod D \quad \text{[Equation 4]}$$

where $Y_{-1}=n_{RNTI}$, A=39827, D=65537 and $k=\lfloor n_s/2 \rfloor$, $n_s$ is the slot number within a radio frame. SI-RNTI, C-RNTI, P-RNTI, RA-RNTI, etc. may be used as an RNTI for $n_{RNTI}$.

For each serving cell on which a PDCCH is monitored, the CCEs corresponding to PDCCH candidate m of the search space $S^{(L)}_k$ are given by the following equation.

$$L\{(Y_k+m') \bmod \lfloor N_{CCE,k}/L \rfloor\}+i \quad \text{[Equation 5]}$$

where $Y_k$ may be defined by Equation 4, and i=0, . . . , L-1. For the CSS, m'=m. For the USS, for the serving cell on which the PDCCH is monitored, if a carrier indicator field is configured for a monitoring UE, for example, if the UE is informed that the carrier indicator field is present on the PDCCH by a higher layer, then $m'=m+M^{(L)} \cdot n_{CI}$ where $n_{CI}$ is a carrier indicator field value. The carrier indicator field value is the same as a serving cell index (ServCellIndex) of a corresponding serving cell. The serving cell index is a short ID used to identify a serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies. In the meantime, if the UE is not configured with carrier indicator field (CIF) then m'=m, where m'=0, . . . , $M^{(L)}-1$. $M^{(L)}$ is the number of PDCCH candidates to monitor in the given search space. Namely, the UE is configured to check $M^{(L)}(\geq L)$ consecutive CCE(s) or CCE(s) arranged according to a specific rule in order to determine whether a PDCCH comprised of L CCEs are transmitted thereto. For reference, the CIF is included in DCI and, in carrier aggregation, the CIF is used to indicate for which cell the DCI carries scheduling information. An eNB may inform the UE of whether the DCI received by the UE may include the CIF through a higher layer signal. That is, the UE may be configured with the CIF by a higher layer. Carrier aggregation is described later in more detail.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity for configuring multi-antenna technology and a DCI format where the UE performs blind decoding in accordance with the corresponding transmission mode. Especially, Table 9 illustrates a relation between PDSCH and PDCCH configured by cell radio network temporary identifier (C-RNTI).

TABLE 9

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-1 |

(RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Generally, a DCI format which can be used for the UE differs according to a transmission mode (TM) configured for the UE. In other words, for the UE configured for a specific transmission mode, not all DCI formats but some DCI format(s) corresponding to the specific transmission mode can be used. For example, the UE is semi-statically configured by higher layers so as to receive PDSCH data transmission, which was signaled through a PDCCH, according to one of a plurality of predetermined transmission modes. Namely, to maintain operation load of the UE according to blind decoding attempt at a predetermined level or less, not all DCI formats are always simultaneously searched by the UE. Table 8 illustrates a transmission mode Transmission modes 1 to 9 are listed in Table 9 but transmission modes other than the transmission modes listed in Table 9 may be defined.

The UE configured to decode the PDCCH with CRC scrambled in C-RNTI by an upper layer decodes the PDCCH and also decodes the corresponding PDSCH in accordance with each combination defined in Table 9. For example, if the UE is configured in transmission mode 1 by upper layer signaling, the UE acquires either DCI of DCI format 1A or DCI of DCI format 1 by respectively decoding the PDCCH through the DCI format 1A and 1. For reference, it can be appreciated that DCI format 1A shown in Table 9 corresponds to every transmission mode. Such a DCI format that is configured irrespective of a transmission mode is referred to as a fallback DCI format and a DCI format that is specific to a transmission mode is referred to as a transmission mode DCI format. For example, among DCI formats corresponding to transmission mode 1, DCI format 1A can be the fallback DCI and DCI format 1 can be the transmission mode DCI format.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

FIG. 6 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

FIG. 7 illustrates an overview of physical channel processing. A baseband signal representing a PUSCH or a PDSCH may be defined by a processing procedure of FIG. 7.

Referring to FIG. 7, a transmitting device may include scramblers 301, modulation mappers 302, a layer mapper 303, a precoder 304, RE mappers 305, and OFDM signal generators 306.

The transmitting device 10 may transmit more than one codeword. The scramblers 301 scramble the coded bits of each codeword, for transmission on a physical channel.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-phase shift keying (m-PSK) and m-quadrature amplitude modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. Here, $N_t$ is corresponding to the number of transmission antennas, and $M_t$ is corresponding the number of layers. Since the precoder 304 is differently configured according to the precoding matrix, if the same precoding matrix is applied to signals, this indicates that the same precoder is applied to signals in the present invention and if different precoding matrices are applied to signals, this indicates that different precoders are applied to signals in the present invention.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to UEs.

The OFDM signal generators 306 modulate the complex-valued modulation symbols for the respective antenna ports, that is, the antenna-specific symbols through OFDM or SC-FDM modulation, thereby producing a complex-valued time domain orthogonal frequency division multiplexing (OFDM) or single carrier frequency division multiplexing (SC-FDM) symbol signal. The OFDM signal generators 306 may perform inverse fast Fourier transform (IFFT) on the antenna-specific symbols and insert a cyclic prefix (CP) into the resulting IFFT time domain symbol. Digital-to-analog conversion, frequency upconversion, etc applied to the OFDM symbol and then transmitted through the transmission antennas to a receiving device 20. The OFDM signal generators 306 may include an IFFT module, a CP inserter, a digital-to-analog converter (DAC), a frequency upconverter, etc.

In the meantime, if the UE or eNB applies the SC-FDMA scheme to codeword transmission, the transmitter or processor may include a discrete Fourier transform (DFT) module 307 (or fast Fourier transform (FFT) module). The DFT module 307 performs DFT or FFT (hereinafter referred to as DFT/FFT) on the antenna specific symbol, and outputs the DFT/FFT symbol to the resource element mapper 305.

The receiving device 20 operates in the reverse order to the operation of the transmitting device 10. Specifically, the receiving device may include a signal recoverer for recovering a received signal into a baseband signal, a multiplexer for multiplexing a received and processed signal, and a channel demodulator for demodulating a multiplexed signal stream into a codeword. The signal recoverer, the multiplexer, and the channel demodulator may be comprised of one integrated module or independent modules for performing respective functions. For example, the signal recoverer may include an analog-to-digital converter (ADC) for converting an analog signal into a digital signal, a CP remover for removing a CP from the digital signal, an FFT module for generating a frequency-domain symbol by performing FFT upon the CP-removed signal, and an RE demapper/equalizer for recovering the frequency-domain symbol into an antenna-specific symbol. The multiplexer recovers the antenna-specific symbol into a transmission layer and the channel demodulator recovers the transmission layer into the codeword that the transmitting device desires to transmit.

Meanwhile, upon receiving signals transmitted by an SC-FDMA scheme, the receiving device 20 further includes an inverse discrete Fourier transmission (IFFT) module (or an inverse fast Fourier transform (IFFT) module). The IDFT/IFFT module performs IDFT/IFFT upon the antenna-specific symbols recovered by the RE demapper and transmits the IDFT/IFFT-processed symbol to the multiplexer.

For reference, the processor 11 of the transmitting device 10 in FIG. 6 may be configured to include the scramblers 301, the modulation mappers 302, the layer mapper 303, the precoder 304, the RE mappers 305, and the OFDM signal generators 306. Likewise, the processor 21 of the receiving device 20 in FIG. 6 may be configured to include the signal recoverer, the multiplexer, and the channel demodulator.

Figure 9:
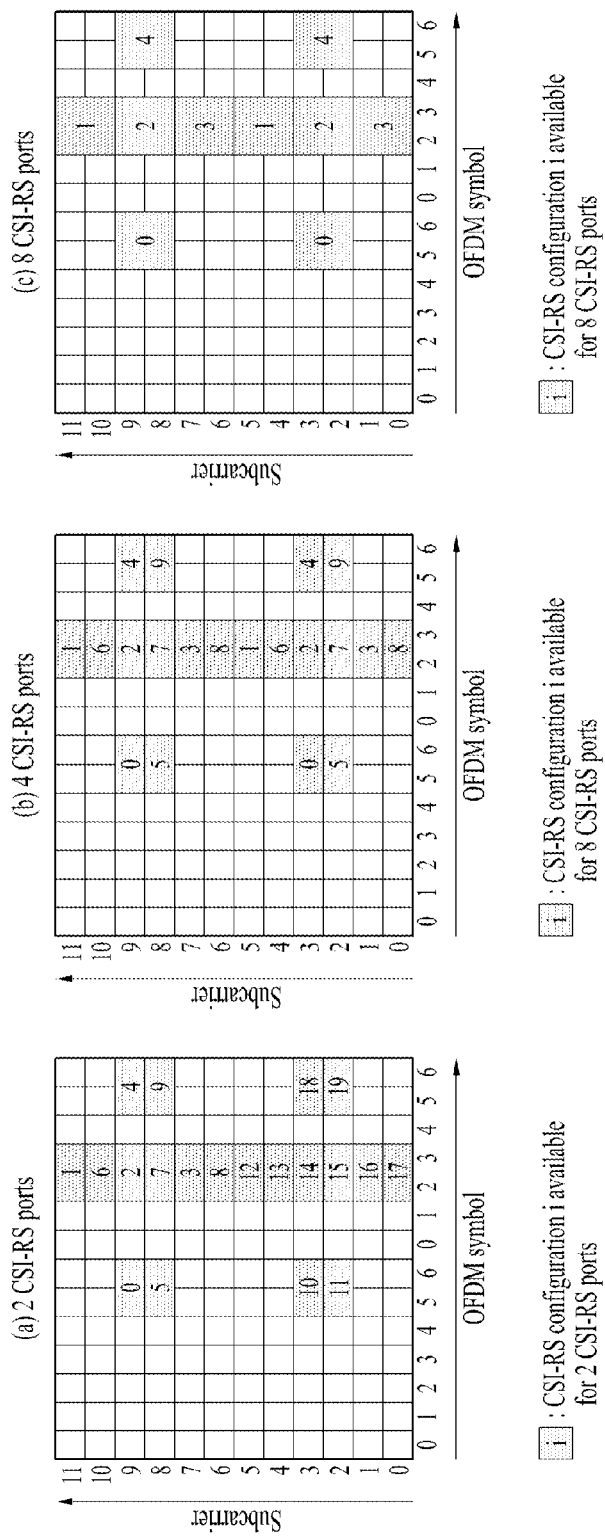
FIGS. 9(a), (b) and (c) illustrate channel state information reference signal (CSI-RS) configurations.
Figure 10:
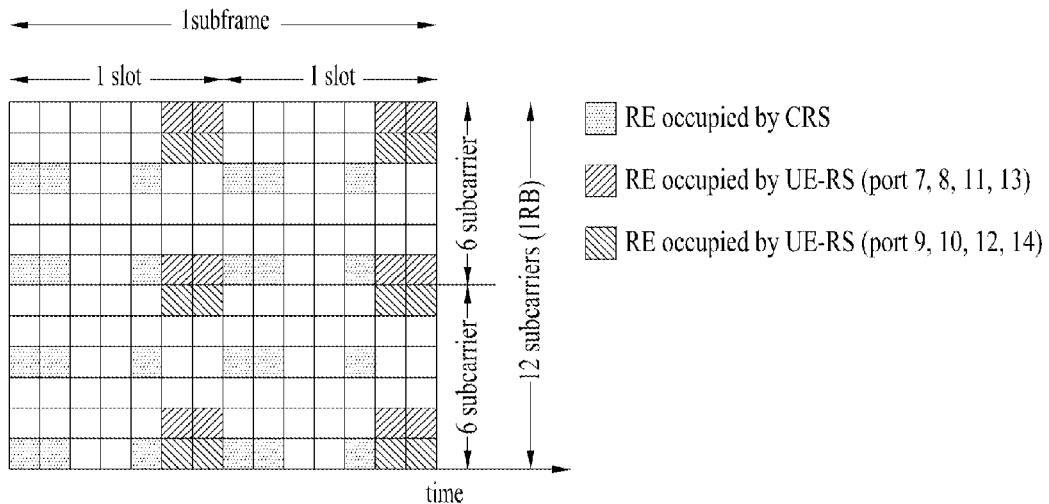
FIG. 10 illustrates UE-specific reference signals (UE-RSs).
Figure 11:
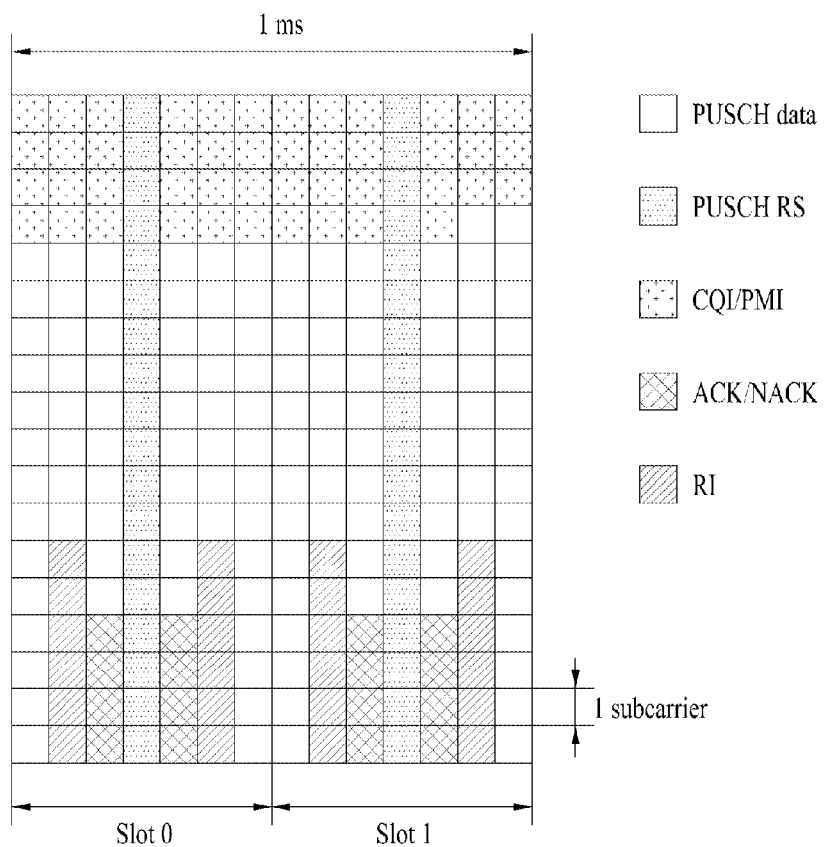
FIG. 11 illustrates multiplexing uplink control information, uplink data, and an uplink UE-RS in a PUSCH region.

In order for the receiving device 20 to restore a signal transmitted by the transmitting device 10, an RS for estimating a channel between the receiving device and the transmitting device is needed. RSs may be categorized into RSs for demodulation and RSs for channel measurement. CRSs defined in the 3GPP LTE system can be used for both demodulation and channel measurement. In a 3GPP LTE-A system, a UE-specific RS (hereinafter, a UE-RS) and a CSI-RS are further defined in addition to a CRS. The UE-RS is used to perform demodulation and the CSI-RS is used to derive CSI. Meanwhile, RSs are divided into a dedicated RS (DRS) and a common RS (CRS) according to whether a UE recognizes presence thereof. The DRS is known only to a specific UE and the CRS is known to all UEs. Among RSs defined in the 3GPP LTE-A system, the cell-specific RS may be considered a sort of the common RS and the DRS may be considered a sort of the UE-RS. For reference, since demodulation can be understood as part of a decoding process, the term demodulation is used interchangeably with the term decoding in the present invention. Hereinafter, RSs will be described with reference to FIG. 8 to FIG. 11. Particularly, FIG. 8 to FIG. 10 are diagrams illustrating DL RSs and FIG. 11 is a diagram illustrating a UL RS.

Figure 8:
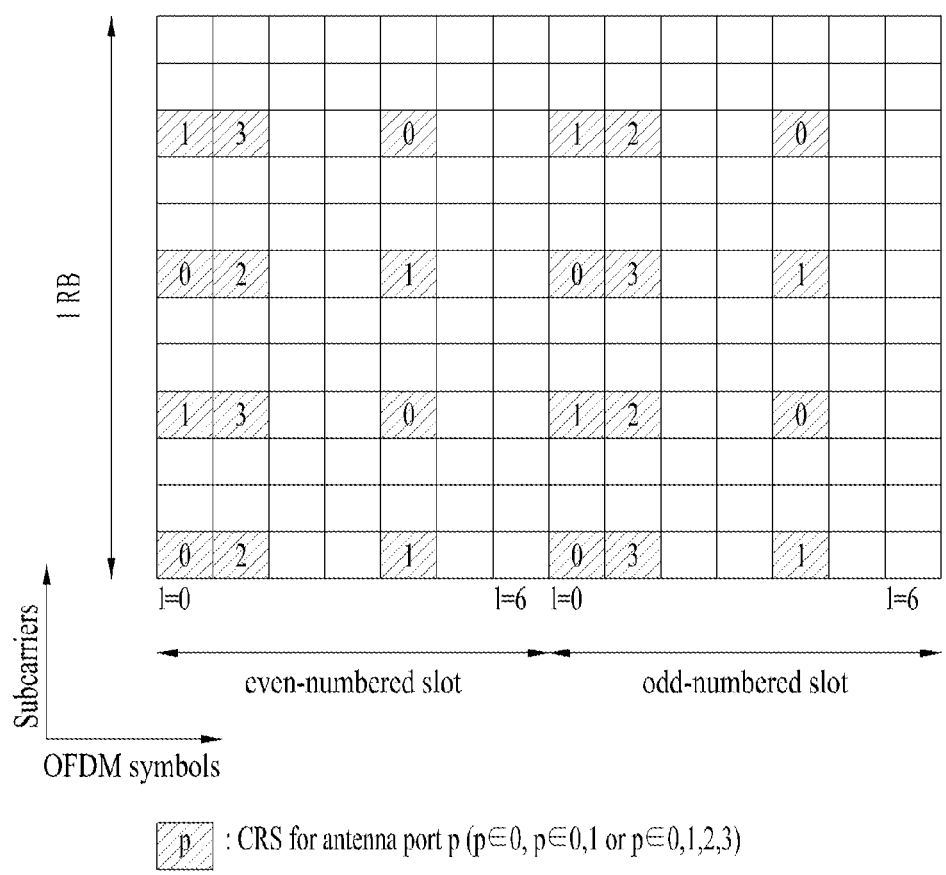
FIG. 8 illustrates configuration of cell specific reference signals (CRSs).

FIG. 8 illustrates configuration of cell specific reference signals (CRSs). Especially, FIG. 8 illustrates configuration of CRSs for a 3GPP LTE system supporting a maximum of four antennas.

In an existing 3GPP system, since CRSs are used for both demodulation and measurement, the CRSs are transmitted in all DL subframes in a cell supporting PDSCH transmission and are transmitted through all antenna ports configured at an eNB.

More specifically, CRS sequence $r_{l,n_s}(m)$ is mapped to complex-valued modulation symbols $a_{k,l}^{(p)}$ used as reference symbols for antenna port p in slot $n_s$ according to the following equation.

$$a_{k,l}^{(p)} = r_{l,n_s}(m') \qquad \text{[Equation 6]}$$

where $n_s$ is the slot number in a radio frame, and l is the OFDM symbol number within the slot, which is determined according to the following equation.

$$k = 6m + (v + v_{shift}) \mod 6 \qquad \text{[Equation 7]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

where k denotes a subcarrier index, l denotes an OFDM symbol index, and $N_{RB}^{max,DL}$ denotes the largest DL bandwidth configuration, expressed as an integer multiple of $N_{sc}^{RB}$.

Parameters v and $v_{shift}$ define locations for different RSs in the frequency domain and v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases} \qquad \text{[Equation 8]}$$

The cell-specific frequency shift $v_{shift}$ is given by a physical layer cell identity $N_{ID}^{cell}$ as follows.

$$v_{shift} = N_{ID}^{cell} \mod 6 \qquad \text{[Equation 9]}$$

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS. Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

FIG. 9 illustrates channel state information reference signal (CSI-RS) configurations.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence $r_{l,n_s}(m)$ is mapped to complex modulation symbols $a_{k,l}^{(p)}$ used as RSs on antenna port p according to the following equation.

$$a_{k,l}^{(p)} = w_{l''} \cdot r_{l,n_s}(m') \qquad \text{[Equation 10]}$$

where $w_{l''}$, k, l are given by the following equation.

$$k = k' + 12m + \qquad \text{[Equation 11]}$$

$$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

where (k', l') and necessary conditions on $n_s$ are given by Table 10 and Table 11 in a normal CP and an extended CP, respectively. That is, CSI-RS configurations of Table 10 and Table 11 denote locations of REs occupied by a CSI-RS of each antenna port in an RB pair.

TABLE 10

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 11

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

FIG. 9(a) illustrates 20 CSI-RS configurations 0 to 19 available for CSI-RS transmission through two CSI-RS ports among the CSI-RS configurations of Table 10, FIG. 9(b) illustrates 10 available CSI-RS configurations 0 to 9 through four CSI-RS ports among the CSI-RS configurations of Table 10, and FIG. 9(c) illustrates 5 available CSI-RS configurations 0 to 4 through 8 CSI-RS ports among the CSI-RS configurations of Table 10. The CSI-RS ports refer to antenna ports configured for CSI-RS transmission. For example, referring to Equation 11, antenna ports 15 to 22 correspond to the CSI-RS ports. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 10 or Table 11 but also with subframes in which CSI-RSs are configured. That is, if subframes for CSI-RS transmission differ even when CSI-RS configuration numbers are the same in Table 10 or Table 11, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number of Table 10 or Table 11 is assigned and a CSI-RS configuration varying according to a CSI-RS configuration number of Table 10 or Table 11, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc. CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table shows CSI-RS subframe configuration $I_{CSI-RS}$ according to $T_{CSI-RS}$ and $\Delta_{CSI-RS}$.

TABLE 12

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying the following equation are subframes including CSI-RSs.

$$(10n_f + \lfloor n_s/2 \rfloor - \Delta_{CSI-RS}) \bmod T_{CSI-RS} = 0 \quad \text{[Equation 12]}$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

FIG. 10 illustrates UE-specific reference signals (UE-RSs). In more detail, FIG. 10 illustrates REs occupied by UE-RSs among REs in one RB of a normal DL subframe having a normal CP.

UE-RSs are transmitted on antenna port(s) p=5, p=7, p=8 or p=7, 8, . . . , ν+6 for PDSCH transmission, where u is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRS s configured to be transmitted in every subframe irrespective of whether the PDSCH is present. Accordingly, overhead of the RS may decrease relative to overhead of the CRS.

Figure 13:
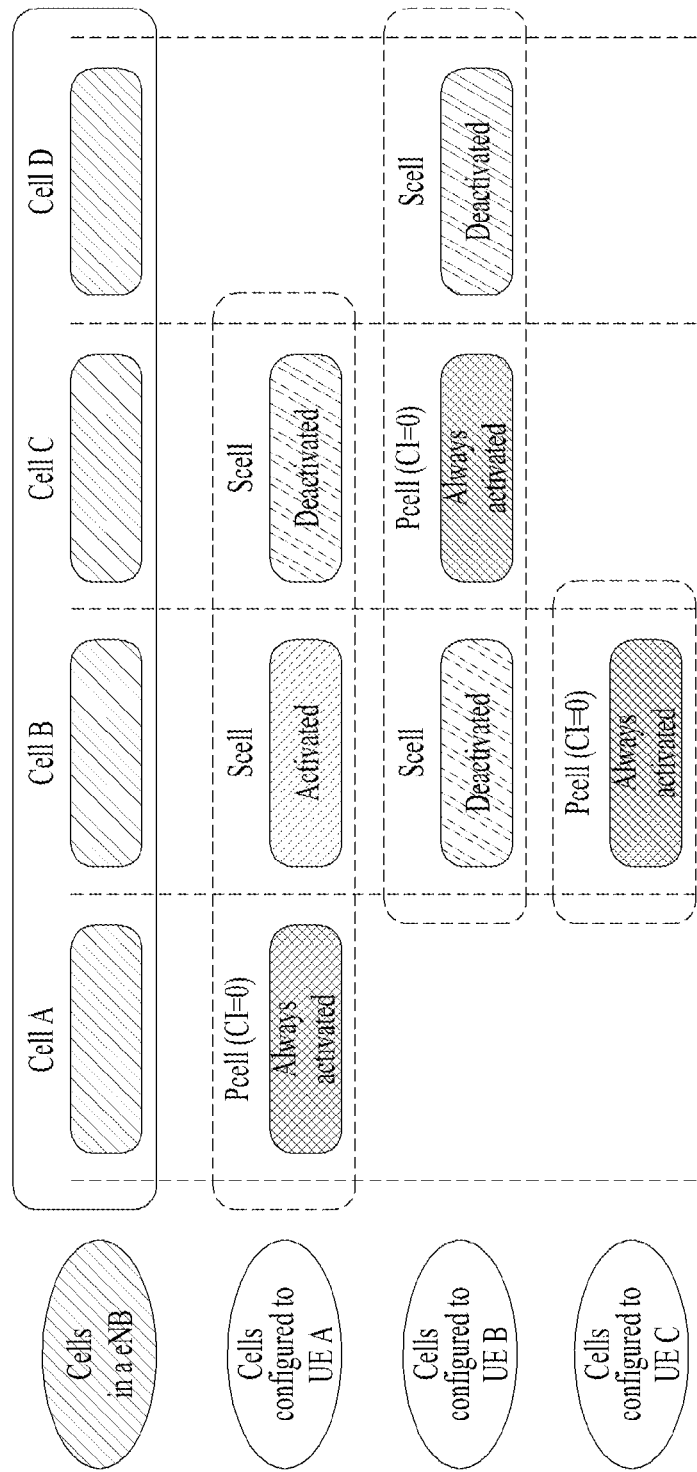
FIG. 13 illustrates the state of cells in a system supporting carrier aggregation.

In the 3GPP LTE-A system, the UE-RSs are defined in a PRB pair. Referring to FIG. 13, in a PRB having frequency-domain index $n_{PRB}$ assigned for PDSCH transmission with respect to p=7, p=8, or p=7, 8, . . . , ν+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{[Equation 13]}$$

where $w_p(i)$, l', m' are given as follows.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad \text{[Equation 14]}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3 \lfloor \frac{l'}{2} \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in a special subframe with configuration 1, 2, 6, or 7 (see Table 2)} \\ 2, 3 & \text{if } n_s \bmod 2 = 1 \text{ and not in a special subframe with configuration 1, 2, 6, or 7 (see Table 2)} \end{cases}$$

$$m' = 0, 1, 2$$

where the sequence $\overline{w}_p(i)$ for the normal CP is given according to the following equation.

TABLE 13

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , ν+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 15]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. The output sequence c(n) of length $M_{PN}$, where n=0, 1, . . . , $M_{PN}$−1, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 16]}$$

where $N_C$=1600 and the first m-sequence is initialized with $x_1(0)$=1, $x_1(n)$=0, n=1, 2, . . . , 30. The initialization of the second m-sequence is denoted by $c_{init} = \sum_{i=0}^{30} x_2(i) \cdot 2^i$ with the value depending on the application of the sequence.

In Equation 15, the pseudo-random sequence generator for generating c(i) is initialized with $c_{init}$ at the start of each subframe according to the following equation.

$$c_{init} = (\lfloor n_s/2 \rfloor + 1) \cdot (2N_{ID}^{cell} + 1) \cdot 2^{16} + n_{SCID} \quad \text{[Equation 17]}$$

where $n_{SCID}$ is 0 unless specified otherwise and is given by DCI format 2B or 2C associated with PDSCH transmission with respect to PDSCH transmission on antenna port 7 or 8. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

As can be appreciated from Equations 13 to 17, UE-RSs are transmitted through antenna port(s) corresponding respectively to layer(s) of a PDSCH. That is, according to Equation 13 to Equation 17, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a PR pair are the same with respect to a UE-RS port regardless of a UE or a cell. As a result, the number of DMRS REs in an RB to which a PDSCH for a specific UE in a specific subframe is mapped is the same. Notably, in RBs to which the PDSCH for different UEs in the same subframe is allocated, the number of DMRS REs included in the RBs may differ according to the number of transmitted layers.

FIG. 11 illustrates multiplexing of UCI, UL data and UL UE-RS on a PUSCH region.

In order for an eNB to decode a UL signal received through a UL channel (e.g. PUCCH or PUSCH), an RS that is to be compared with the UL signal is needed. Hereinafter, an RS for demodulating a UL signal (e.g. DCI) through the PUCCH will be referred to as a PUCCH DM RS and an RS for demodulating a UL signal (e.g. UL data) through the PUSCH will be referred to as a PUSCH DM RS. The PUCCH DM RS is transmitted in a PUCCH region in order to demodulate DCI transmitted through the PUCCH in the PUCCH region and the PUSCH DM RS is transmitted in a PUSCH region in order to demodulate UCI and/or data through a PUSCH in the PUSCH region as illustrated in FIG. 11. The PUCCH DM RS and the PUSCH DM RS may be collectively referred to as a UL UE-RS or a UL DMRS.

Referring to FIG. 11, CQI and/or PMI (CQI/PMI) resources are located at the start part of PUSCH data resources. The CQI/PMI resources are sequentially mapped to all SC-FDMA symbols on one subcarrier and then are mapped on the next subcarrier. The CQI/PMI resources are mapped starting from left to right, that is, in the direction of ascending SC-FDMA symbol index, within a subcarrier. The PUSCH data is rate-matched in consideration of the amount of the CQI/PMI resources (i.e. the number of coded symbols). A modulation order which is the same as the modulation order of UL-SCH data is used for CQI/PMI. ACK/NACK is inserted through puncturing part of SC-FDMA resources to which UL-SCH data is mapped. ACK/NACK is located besides a PUSCH RS which is an RS used to demodulate the PUSCH data and is filled starting bottom to top, that is, in the direction of ascending subcarrier index, within an SC-FDMA symbol. In the case of a normal CP, SC-FDMA symbols for ACK/NACK are located at SC-FDMA symbols #2/#5 in each slot as illustrated in FIG. 11. Irrespective of whether ACK/NACK is actually transmitted in a subframe, a coded RI is located next to the symbol for ACK/NACK.

The PUCCH DM RS is transmitted using a predetermined number of SC-FDMA symbols in each RB of an RB pair occupied by a PUCCH after being spread by a predetermined length of an orthogonal sequence according to a PUCCH format and/or CP length. For example, in the case of a normal CP, a PUCCH DM RS for a series of PUCCH format 1 may be spread by a length-3 orthogonal sequence and then transmitted over OFDM symbols #2 to #4 among OFDM symbols #0 to #6 of each RB occupied by the PUCCH and a PUCCH DM RS for a series of PUCCH formats 2 and 3 may be spread by a length-2 orthogonal sequence and then transmitted over OFDM symbols #1 and #5 among OFDM symbols #0 to #6 of each RB occupied by the PUCCH.

Figure 12:
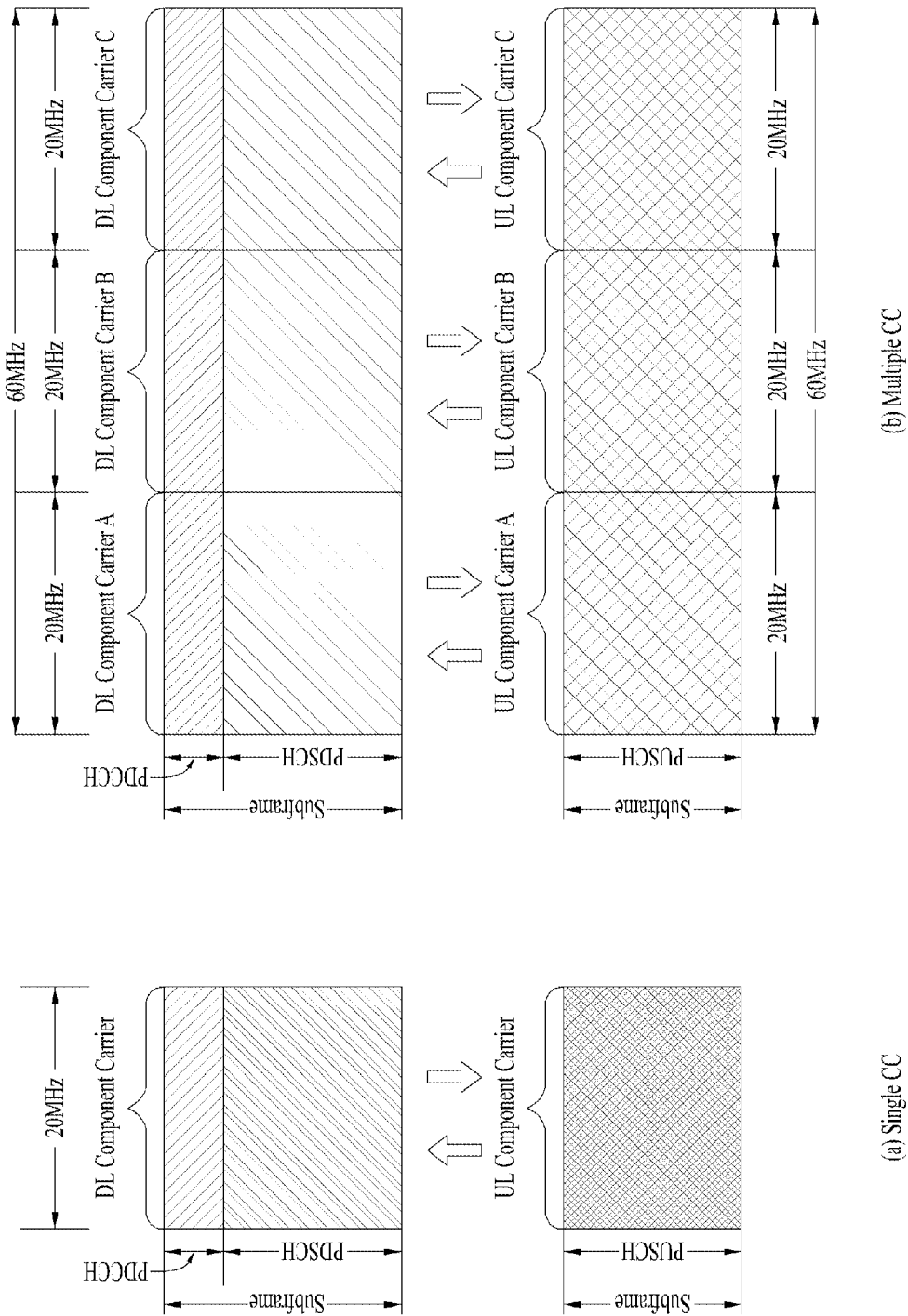
FIGS. 12 (a) and (b) are diagrams for explaining single-carrier communication and multi-carrier communication.

FIG. 12 is a diagram for explaining single-carrier communication and multi-carrier communication. Specially, FIG. 12(a) illustrates a subframe structure of a single carrier and FIG. 12(b) illustrates a subframe structure of multiple carriers.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a BW of 60 MHz. The CCs may be contiguous or non-contiguous in the frequency domain. Although a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

FIG. 13 illustrates the state of cells in a system supporting carrier aggregation (CA).

In FIG. 13, the configured cell for the UE may be a serving cell in terms of the UE. The configured cell for the UE, i.e. the serving cell, preserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. In order to distinguish between serving cell(s), serving cell indexes may be used. For example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term cell used in CA is distinguished from the term cell referring to a prescribed geographic region to which a communication service is provided by one eNB or one antenna group. To distinguish between a cell indicating a prescribed geographic region and a cell of CA, in the present invention, the cell of CA is referred to as a CC and the cell of a geographic region is referred to as a cell.

In a CA situation, a plurality of serving CCs may be configured for one UE. A scheme performed by a control channel for scheduling a data channel can be divided into existing linked carrier scheduling and cross carrier scheduling. In link carrier scheduling, a control channel transmitted on a specific CC schedules only a data channel which is to be transmitted or received on the specific CC. In contrast, in cross carrier scheduling, a serving CC having a good channel state may be used to transmit a UL/DL grant for another serving CC. In cross carrier scheduling, a CC on which a UL/DL grant which is scheduling information is transmitted may be different from a CC on which UL/DL transmission corresponding to the UL/DL grant is performed. In cross carrier scheduling, a control channel schedules, using a carrier indicator field (CIF) in DCI, a data channel transmitted on a CC different from a CC on which a PDCCH carrying the DCI is configured. When cross carrier scheduling (also referred to as cross-CC scheduling) is applied, a PDCCH for DL assignment may be transmitted on, for example, DL CC#0 and a PDSCH corresponding to the PDCCH may be transmitted on, for example, DL CC#2. Whether a CIF is present in the PDCCH may be configured semi-statically and UE-specifically (or UE group-specifically) by higher layer signaling (e.g. RRC signaling). The baseline of PDCCH transmission is summarized as below.

CIF disabled: A PDCCH on a DL CC assigns PDSCH resources on the same DL CC or PUSCH resources on a single linked UL CC.

CIF enabled: A PDCCH on a DL CC can assign PDSCH or PUSCH resources on a specific DL/UL CC among multiple aggregated DL/UL CCs using the CIF.

In the case of presence of the CIF, the eNB may assign a PDCCH monitoring DL CC set for reduction of BD complexity of the UE. The PDCCH monitoring DL CC set is a portion of the entire aggregated DL CCs and includes one or more DL CCs. The UE performs detection/decoding of PDCCHs on corresponding DL CCs. In other words, upon scheduling a PDSCH/PUSCH for the UE, the eNB transmits the PDCCH only through the PDCCH monitoring DL CC set. The PDCCH monitoring DL CC set may be configured UE-specifically, UE-group-specifically, or cell-specifically. The term "PDCCH monitoring DL CC" may be replaced with an equivalent term such as monitoring carrier, monitoring cell, etc. In addition, a CC aggregated for the UE may be replaced with an equivalent term such as serving CC, serving carrier, serving cell, etc.

A future LTE-A system is configured to form an NCT CC and it is considered to use the NCT CC as a stand-alone CC or an SCC. In the case of an LCT CC, radio resources usable for transmission/reception of physical UL/DL channels and radio resources usable for transmission/reception of physical UL/DL signals, among radio resources operating on the LCT CC, are predetermined as described in FIG. 1 to FIG. 5 and FIG. 8 to FIG. 11. In other words, the LCT CC needs to be configured to carry the physical channels/signals not through an arbitrary time frequency on an arbitrary time resource but through a specific time frequency on a specific time resource according to a type of a physical channel or a physical signal. For example, PDCCHs may be configured only on front OFDM symbol(s) among OFDM symbols of a DL subframe and PDSCHs cannot be configured on the front OFDM symbol(s) to which the PDCCHs are likely to be mapped. As another example, CRS(s) corresponding to antenna port(s) of an eNB are transmitted in every subframe on REs illustrated in FIG. 8 over all bands irrespective of a DL BW of a CC. Then, if the number of antenna ports of the eNB is one, REs indicated by '0' in FIG. 8 cannot be used for other DL signal transmission and, if the number of antenna ports of the eNB is four, REs indicated by '0', '1', '2', and '3' in FIG. 8 cannot be used for other DL signal transmission. In addition, various constraints on configuration of the LCT CC are present and such constraints have increased according to development of a communication system. Since some of these constraints were created due to a communication technology level at the time when the constraints were made, there are unnecessary constraints according to development of communication technology. In addition, a constraint on legacy technology and a constraint on new technology may be simultaneously present for the same purpose. In this way, as constraints have significantly increased, constraints introduced for development of the communication system make it rather difficult to efficiently use radio resources of the CC. For example, although a CRS need not be transmitted on all antenna ports in every subframe due to introduction of a CSI-RS and a UE-RS, the CRS is present per antenna port in every subframe in order to support a UE that cannot support the CSI-RS and UE-RS. However, since UEs that cannot support the CSI-RS/UE-RS will disappear over time, the necessity of using a legacy CRS having significant RS overhead together with the CSI-RS and UE-RS is gradually being reduced. In consideration of this state, it is necessary to configure a CC free from the constraints of the CRS.

Accordingly, introduction of an NCT CC that is free from unnecessary constraints due to advances in communication technology and is capable of being configured according to simpler constraints than conventional constraints has been discussed. Since the NCT CC is not configured according to constraints of a legacy system, the NCT CC cannot be recognized by a UE implemented by the legacy system.

In the present invention, the NCT CC may not satisfy at least one of a constraint indicating that a CRS should be configured in every DL subframe in a cell, a constraint indicating that the CRS should be configured in the cell per antenna port of an eNB, and a constraint indicating that the CRS should be transmitted over all bands, and a constraint indicating that a predetermined number of front OFDM symbols of a DL subframe should be reserved for transmission of a control channel such as a PDCCH over an entire frequency band of the corresponding CC. For example, on the NCT CC, the CRS may be configured not in every subframe but in a predetermined number (>1) of subframes. Alternatively, on the NCT CC, only the CRS for one antenna port (e.g. antenna port 0) may be configured irrespective of the number of antenna ports of the eNB. Alternatively, a TRS for tracking of time synchronization and/or frequency synchronization may be newly defined instead of a legacy CRS for channel state measurement and demodulation and the TRS may be configured in some subframes and/or on some frequency resources of the NCT CC. That is, on the LCT CC, the CRS is fixedly transmitted over an entire band on some OFDM symbol(s) of at least a front part in all subframes, in terms of RS transmission. In contrast, on the NCT CC, fixed CRS transmission having high density may be omitted or may be remarkably reduced. In addition, CRS transmission is fixed on the LCT CC, whereas CRS transmission time, transmission band, and transmission antenna ports in CRS transmission may be configurable on the NCT CC. Alternatively, a PDSCH may be configured on front OFDM symbols of the NCT CC, a PDCCH may be configured in a legacy PDSCH region rather than the front OFDM symbols, or the PDSCH may be configured using some frequency resources of the PDCCH. For example, the TRS may be transmitted through one port in every integer multiple of 5 ms over an entire frequency band. Hereinafter, a CRS used only for tracking or a new RS will be referred to as a TRS. Since the TRS is not used for demodulation, the TRS corresponds to a measurement RS in terms of usage. Alternatively, a DL resource can be efficiently used on the NCT CC by improving DL reception performance and minimizing RS overhead through UE-RS based DL data reception and (configurable) CSI-RS based channel state measurement having relatively low density. For example, on the LCT CC, a CRS is transmitted on DL as default, whereas, on the NCT CC, only a UE-RS for DL data demodulation and a CSI-RS for channel state measurement may be transmitted without the CRS.

In CA, the NCT CC may be used as an SCC. Since the NCT CC used as the SCC is not considered to be used by an LCT UE, the LCT UE need not perform cell search, cell selection, cell reselection, etc. on the NCT CC. If the NCT CC is not used as a PCC and is used only as the SCC, the NCT CC cannot be used by the LCT UE and unnecessary constraints can be reduced as compared with the LCT CC which can also be used as the PCC, thereby more efficiently using cells. However, it may be considered that the NCT CC will be used as a stand-alone NCT CC capable of also being used as an independent PCC in the future.

Figure 14:
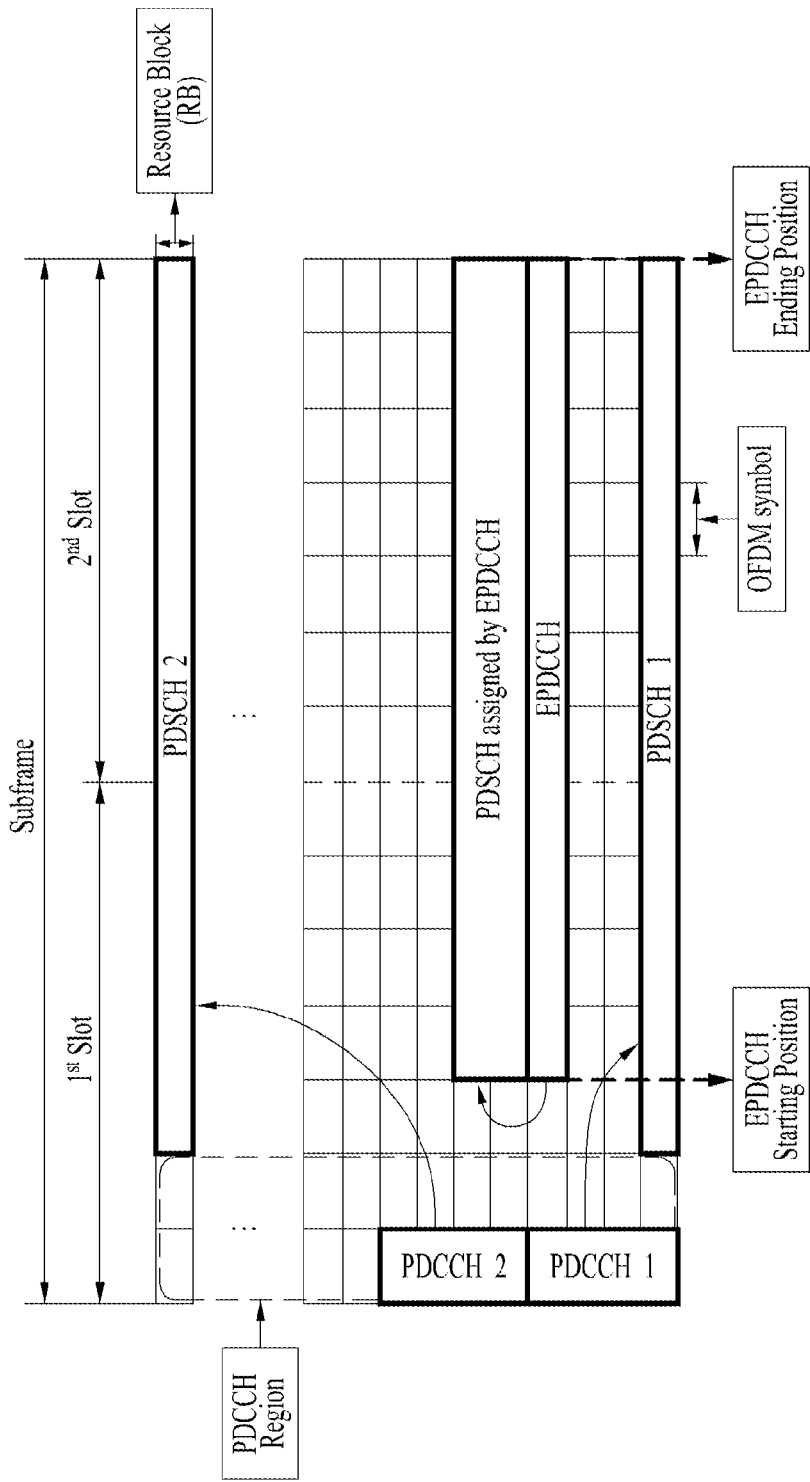
FIG. 14 illustrates a data channel scheduled by a physical downlink control channel (PDCCH) or an enhanced PDCCH (EPDCCH) and a PDCCH/EPDCCH.

FIG. 14 illustrates a physical downlink control channel (PDCCH) or an enhanced PDCCH (EPDCCH), and a data channel scheduled by PDCCH/EPDCCH. Particularly, FIG. 14 illustrates the case in which the EPDCCH is configured by spanning the fourth symbol to the last symbol of a subframe. The EPDCCH may be configured using consecutive frequency resources or may be configured using discontinuous frequency resources for frequency diversity.

Referring to FIG. 14, PDCCH 1 and PDCCH 2 may schedule PDSCH 1 and PDSCH 2, respectively, and the EPDCCH may schedule another PDSCH. Similarly to the case of a PDCCH, specific resource assignment units may be defined for the EPDCCH and the EPDCCH may be configured by a combination of the defined specific resource assignment units. When the specific resource assignment units are used, there is an advantage of enabling execution of link adaptation because less resource assignment units can be used to configure the EPDCCH in the case of a good channel state and more resource assignment units can be used to configure the EPDCCH in the case of a poor channel state. Hereinafter, in order to distinguish a basic unit of the EPDCCH from a CCE which is a basic unit of the PDCCH, the basic unit of the EPDCCH will be referred to as an enhanced CCE (ECCE). It is assumed hereinafter that, for an aggregation level L of the EPDCCH, the EPDCCH is transmitted on an aggregation of L ECCEs. Namely, like the aggregation level of the PDCCH, the aggregation level of the EPDCCH also refers to the number of ECCEs used for transmission of one DCI. Hereinafter, an aggregation of ECCEs on which the UE is capable of detecting the EPDCCH thereof will be referred to as an EPDCCH search space. DCI carried by the EPDCCH is mapped to a single layer and precoded.

The ECCEs constituting the EPDCCH may be categorized into a localized ECCE (hereinafter, L-ECCE) and a distributed ECCE (hereinafter, D-ECCE) according to a scheme of mapping the ECCE(s) to RE(s). The L-CCE means that REs constituting an ECCE are extracted from the same PRB pair. If the EPDCCH is configured using L-ECCE(s), beamforming optimized for each UE can be performed. On the other hand, the D-ECCE corresponds to the case in which REs constituting the ECCE are extracted from different PRB pairs. Unlike the L-ECCE, the D-ECCE can acquire frequency diversity in spite of a restriction on beamforming. In localized mapping, a single antenna port p∈{107, 108, 109, 110} used for EPDCCH transmission is a function of index(es) of the ECCE for defining the EPDCCH. In distributed mapping, REs in an EREG are associated in a manner of alternating with one of two antenna ports.

Unlike a PDCCH transmitted based on a CRS, the EPDCCH is transmitted based on a demodulation RS (hereinafter, DM-RS). Therefore, the UE decodes/demodulates the PDCCH based on the CRS and decodes/demodulates the EPDCCH based on the DM-RS. The DM-RS associated with EPDCCH is transmitted on the same antenna port p∈{107, 108, 109, 110} as the associated EPDCCH physical resource; is present for EPDCCH demodulation only if the EPDCCH is associated with the corresponding antenna port; and is transmitted only on the PRB(s) upon which the corresponding EPDCCH is mapped.

In case of a normal CP, for the antenna port p∈{107, 108, 109, 110} in a PRB with an index $n_{PRB}$ assigned for the EPDCCH transmission, a part of DM-RS sequence r(m) can be mapped to complex-valued modulation symbols $a^{(p)}_{k,l}$ according to the following equation.

$$a_{k,l}^{(p)} = w_p(l') \cdot r(3 \cdot l' \cdot N_{RB}^{max,DL} + 3 \cdot n_{PRB} + m')$$ [Equation 18]

where $w_p(i)$, l', and m' can be given according to the following equation.

$$w_p(i) = \begin{cases} \overline{w}_p(i) & (m' + n_{PRB})\mod 2 = 0 \\ \overline{w}_p(3-i) & (m' + n_{PRB})\mod 2 = 1 \end{cases}$$ [Equation 19]

$$k = 5m' + N_{sc}^{RB} n_{PRB} + k'$$

$$k' = \begin{cases} 1 & p \in \{107, 108\} \\ 0 & p \in \{109, 110\} \end{cases}$$

$$l = \begin{cases} l'\mod 2 + 2 & \text{if in a special subframe with configuration 3, 4, or 8 (see Table 2)} \\ l'\mod 2 + 2 + 3\left\lfloor\frac{l'}{2}\right\rfloor & \text{if in a special subframe with configuration 1, 2, 6, or 7 (see Table 2)} \\ l'\mod 2 + 5 & \text{if not in a special subframe} \end{cases}$$

$$l' = \begin{cases} 0, 1, 2, 3 & \text{if } n_s\mod 2 = 0 \text{ and in a special subframe with configuration 1, 2, 6, or 7 (see Table 2)} \\ 0, 1 & \text{if } n_s\mod 2 = 0 \text{ and not in a special subframe with configuration 1, 2, 6, or 7(see Table 2)} \\ 2, 3 & \text{if } n_s\mod 2 = 1 \text{ and not in a special subframe with configuration 1, 2, 6, or 7(see Table 2)} \end{cases}$$

$$m' = 0, 1, 2$$

The sequence $\overline{w}_p(i)$ for normal CP is given according to the following equation.

TABLE 13

| Antenna port p | $[\overline{w}_p(0)\ \overline{w}_p(1)\ \overline{w}_p(2)\ \overline{w}_p(3)]$ |
|---|---|
| 107 | [+1 +1 +1 +1] |
| 108 | [+1 −1 +1 −1] |
| 109 | [+1 +1 +1 +1] |
| 110 | [+1 −1 +1 −1] |

For example, REs occupied by UE-RS(s) of antenna port 7 or 8 in FIG. 10 may be occupied by DM-RS(s) of antenna port 107 or 108 in a PRB to which the EPDCCH is mapped and REs occupied by UE-RS(s) of antenna port 9 or 10 in FIG. 10 may be occupied by DM-RS(s) of antenna port 109 or 110 in a PRB to which the EPDCCH is mapped. Consequently, as in a UE-RS for demodulating a PDSCH, if the type of the EPDCCH and the number of layers are the same in a DM-RS for demodulating the EPDCCH, REs of a predetermined number per RB are used for DM-RS transmission regardless of a UE or a cell. Hereinafter, the PDCCH or the EPDCCH will be referred to as an (e)PDCCH.

Figure 15:
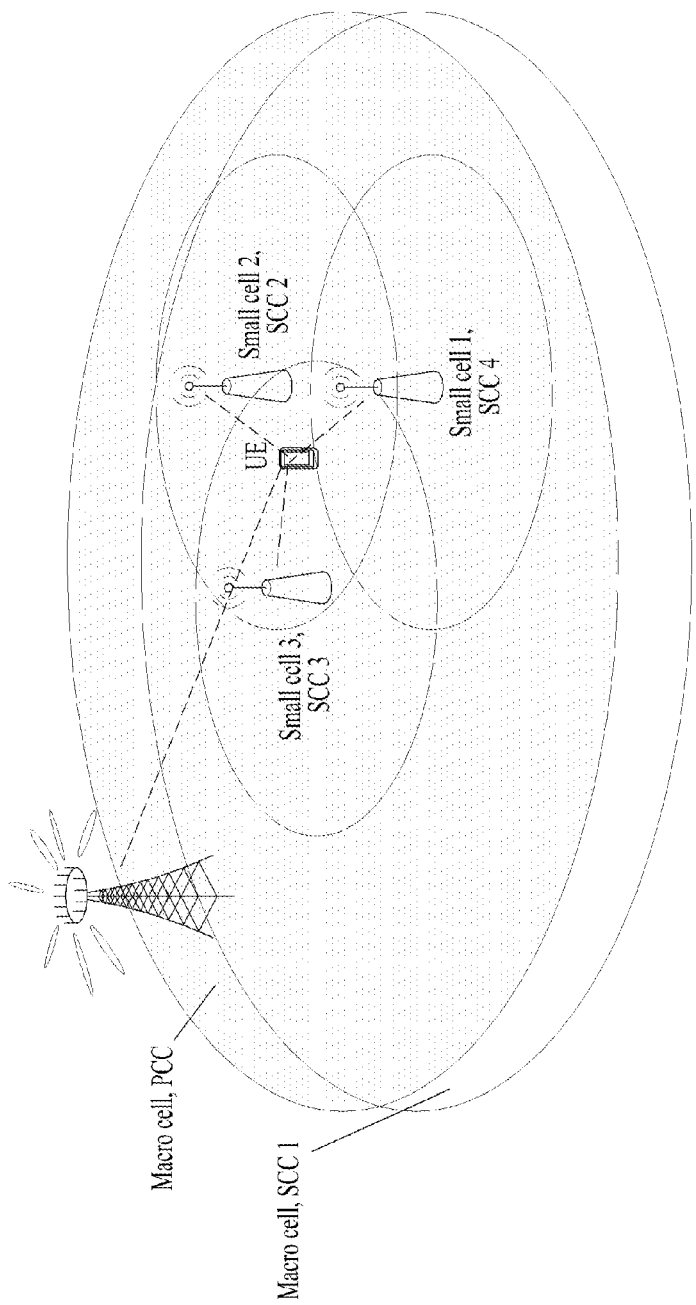
FIG. 15 is a diagram for explaining inter-site carrier aggregation and intra-site carrier aggregation.

FIG. 15 is a diagram for explaining inter-site carrier aggregation and intra-site carrier aggregation.

When a plurality of CCs is aggregated for transmission in a legacy LTE/LTE-A system, if a PCC is present which can perform access to a stand-alone CC and transmission/reception of a control signal and data by enabling data transmission, cell ID acquisition, system information transmission, and physical control signal transmission and an SCC is configured which can perform data transmission/reception only through aggregation with the PCC, it has been assumed that UL/DL frame time synchronization of the SCC is equal to time synchronization of the PCC under the assumption that CCs that are not far away from each other in the frequency domain are aggregated.

In addition, in the legacy LTE/LTE-A system, only the case in which aggregated CCs are used by one node and center frequencies of the CCs are adjacent to each other so that frequency characteristics are similar has been considered. However, the case in which CCs configured for the UE are used by a plurality of nodes separated by a predetermined distance or more rather than by one node may be considered and frequency aggregation between inter-frequencies having different frequency characteristics may also be considered. If different nodes participate in CA using different CCs or the same CC, that is, if different cells participate in CA using the same CC or different CCs, the aggregated CC(s) may be connected by an ideal backhaul or a non-ideal backhaul. The ideal backhaul refers to a backhaul having very high throughput and a very low delay, such as dedicated point-to-point connection using an optical fiber, a line-of-sight (LOS) microwave, etc. In contrast, the non-ideal backhaul refers to a typical backhaul widely used in the market, such as an x digital subscriber line (xDSL) or a non-line-of-sight (NLOS) microwave. It may be assumed that the ideal backhaul has no delay in information exchange between cells or nodes.

Meanwhile, introducing a small cell, coverage of which is narrower than coverage of an existing cell has been considered. The existing cell, coverage of which is wider than coverage of the small cell is called a macro cell. The small cell provide services in a narrower range than a range in which the existing cell or CC can provide services through power of the corresponding cell, frequency characteristics, etc. Since the small cell using low power can be easily arranged in indoor and outdoor hot spots, the small cell can be usefully used according to explosive increase of communication traffic. The node of low power generally refers to a node having lower transmit power than transmit power of a macro node and a normal eNB. For example, a pico eNB and a femto eNB may be used as nodes of low power. When a UE having low mobility requires high throughput, data transmission efficiency can be raised if the UE uses the small cell. For deployment of the small cell, an LCT CC may be used or an NCT CC may be used. The small cell may be deployed in a currently existing frequency band or in a frequency band that is to be used in the future. If a cell is deployed using a high frequency band (e.g. a band of 3.5

GHz), channel characteristics may variously differ according to time or frequency or according to (geographic/spatial) locations. Meanwhile, since coverage of the small cell is narrow, if mobility of the UE increases, the UE immediately leaves coverage of the cell and needs to hand over to another cell. In this case, overhead caused by handover is more frequently generated in same cells relative to normal cells. However, if the small cell is used for a UE having very low mobility, channel characteristics for the UE in the small cell are not abruptly changed and can be stably maintained. Accordingly, it may be effective to transmit a UL/DL DMRS, i.e. a UE-RS, through more REs or less REs than current REs according to an environment.

In consideration of this fact, the present invention proposes using a demodulation RS (hereinafter, DMRS) that can include various RS densities and/or locations.

A. Scheme for Adjusting DMRS Density

The present invention proposes using a different DMRS pattern per UE or per CC when there are DMRS patterns having various densities and various locations. The present invention is applicable to both a DL environment and a UL environment.

Indication of a DMRS Pattern

An eNB may cell-specifically or UE-specifically use a pattern of a DMRS (hereinafter, a DMRS pattern or DMRS configuration) having a different density and/or a different location according to various environments. The DMRS pattern may be differently applied according to an operating frequency band of a specific CC. That is, a DMRS density and/or a DMRS location may be differently configured according to an operation frequency band of a CC. A different DMRS pattern may be applied per specific number of RBs of a subframe on one CC or per PDSCH/PUSCH. In particular, a different DMRS pattern may be applied according to a modulation scheme or a modulation and coding scheme (MCS) used in each RB or each PDSCH/PUSCH. In an existing system, a DMRS is transmitted using the same DMRS pattern regardless of UEs (if the number of layers is identical) or cells. In other words, in the existing system, REs that can be occupied by a DMRS among REs in a predetermined time-frequency resource region do not depend on the UEs and the cells. In contrast, according to the present invention, a DMRS pattern may be UE-specifically and/or cell-specifically configured.

A PBCH on an LCT CC is transmitted by the same antenna port(s) as antenna port(s) that transmits a CRS. Therefore, a UE may decode the PBCH on the LCT CC based on the CRS. As opposed to the CRS on the LCT CC, the CRS is not transmitted on the NCT CC or a CRS for tracking or a TRS is transmitted on the NCT CC wherein the tracking CRS/TRS is not used for decoding purposes. Accordingly, in the present invention, the PBCH may be transmitted together with the DMRS on the NCT CC on which the CRS or TRS that cannot be used for the purpose of decoding is transmitted. If the PBCH is transmitted based on the DMRS, the UE may decode the PBCH based on the DMRS. In consideration of this fact, according to the present invention, the eNB may inform the UE of a DMRS pattern associated with demodulation or decoding of a physical channel for the UE using the PBCH. The UE may detect the DMRS pattern used on a related CC by blind-decoding the PBCH. For example, a cell-specific DMRS pattern is used in a PBCH region (e.g. RB(s) to which the PBCH is mapped) according to a CC and the UE may detect the DMRS pattern used on the CC by blind-decoding the PBCH using pre-known DMRS patterns. Alternatively, the UE may detect the DMRS pattern used in an (e)PDCCH of the CC by blind-decoding the PBCH.

The eNB may inform the UE of a DMRS pattern that is to be used on a specific CC through the PBCH or system information. The eNB may add a field for indicating a DMRS pattern of DL/UL to the PBCH or the system information to inform the UE of the DMRS pattern. Alternatively, the eNB may inform the UE of a DMRS pattern that is to be used in an (e)PDCCH of the CC through the PBCH or the system information.

The eNB may inform the UE of the DL/UL DMRS pattern that is to be used on the specific CC through an RRC signal. Alternatively, the eNB may inform the UE of the DMRS pattern that is to be used in the (e)PDCCH through the RRC signal. Alternatively, the eNB may inform the UE of a DMRS pattern that is to be used in a PDSCH/PUSCH through the RRC signal.

The eNB may use a specific field of the (e)PDCCH in order to inform the UE of the DMRS pattern that is to be used in a specific RB or a specific PDSCH/PUSCH region. The UE may acquire information about the DMRS pattern used in the PDSCH/PUSCH indicated by a PDCCH from the (e)PDCCH and use the DMRS pattern information to demodulate the PDSCH/PUSCH. In this case, the UE may acquire the DMRS pattern information through a field explicitly added to the (e)PDCCH. Alternatively, the UE may acquire the DL/UL DMRS pattern information in DL/UL through a value of an already existing specific bit or specific field of the (e)PDCCH. Alternatively, the UE may implicitly obtain the DMRS pattern information according to state value(s) of one or multiple already existing fields of the (e)PDCCH.

Alternatively, the UE may use a different DMRS pattern according to an MCS or a modulation scheme used in a specific RB. To this end, the eNB and the UE may share in advance a DMRS pattern to be used according to the modulation scheme or the MCS used in the specific RB.

Under the state in which the UE is connected to one eNB, if the UE performs handover to another eNB, the eNB (source eNB) that has been connected to the UE may inform the UE of a DMRS pattern that is to be used in a new eNB (target eNB) to which the UE performs handover.

Through the above method, the eNB may UE-specifically or cell-specifically configure a different DMRS pattern to be used in the PUSCH. Alternatively, the eNB may UE-specifically or cell-specifically configure a different DMRS pattern to be used in the PDSCH. The eNB may configure a DMRS pattern such that a different DMRS pattern per PRB bundling or per RB is applied to a PDSCH region used by the same UE. The DMRS pattern may include a null DMRS pattern. That is, a PRB bundle without a DMRS among PRB bundle(s) in the PDSCH region may be configured or an RB without the DMRS among RB(s) in the PDSCH region may be configured.

The eNB may configure DL such that a different DMRS pattern per RB in a PRB bundle is applied. In this case, a DMRS may not be transmitted through a specific RB in the PRB bundle. The DMRS may be transmitted through at least one RB in one PRB bundle.

The eNB may configure UL such that the DMRS is transmitted only through some RB(s) in a PUSCH region allocated to one UE. In this case, RBs used for transmission of the DMRS may be consecutive RB(s). In this case, a DMRS pattern may include a null DMRS pattern. That is, the null DMRS pattern may also be configured in RB(s) of the PUSCH region or the PUSCH region. If the eNB configures the null DMRS pattern in the PUSCH region or RB(s), the eNB does not transmit the DMRS in the PUSCH region or the RB(s) and the UE assumes that the DMRS is not transmitted in the PUSCH region or the RB(s).

In the present invention, the DMRS pattern may be configured to have a different pattern on a subframe basis or on a slot basis with respect to a specific UE.

DMRS Pattern(s) for Various Densities

In the present invention, multiple DMRS densities may be present as opposed to a conventional system. In this case, different DMRS patterns may be configured with respect to the respective densities. For example, when there are four different DMRS densities, four DMRS patterns corresponding respectively to the densities may be configured. Therefore, in the conventional system, if the number of layers used for PDSCH transmission is the same, the number of REs occupied by the DMRS per RB is the same regardless of a UE and a cell. In contrast, according to the present invention, even if the number of layers used for PDSCH transmission is the same, the number of REs occupied by the DMRS in a predetermined time-frequency resource region may differ according to density. The present invention has the advantage of being capable of defining an optimized DMRS pattern according to each density. Thus, when there are DMRS patterns corresponding respectively to densities, an eNB may apply a DMRS pattern having the same or different density per CC or apply a DMRS pattern having the same or different density per UE. Multiple DMRS patterns that can be used by the UE may include DMRS patterns that have the same density but are placed at different locations of REs. For example, DMRS patterns may be defined in which locations of REs occupied by a DMRS in a predetermined time-frequency resource region are different but the number of REs occupied by the DMRS in the predetermined time-frequency resource region is the same.

As a method for configuring DMRS patterns having multiple densities, a default DMRS pattern may be configured first and then an additional DMRS may be used in order to raise a DMRS density.

FIG. 16 illustrates DMRS patterns according to an embodiment of the present invention.

For a default DMRS, a fixed RE location and sequence may be used according to a CC. Unlike a DMRS pattern of a conventional system in which a DMRS RE location is fixed irrespective of a cell, the default DMRS of the present invention may be a cell-specific RS and may depend upon a cell ID. Alternatively, the eNB may directly configure a default DMRS pattern. An additional DMRS is not transmitted without the default DMRS and may always be transmitted together with the default DMRS. In other words, according to an embodiment of the present invention, additional REs may be used for DMRS transmission in addition to REs corresponding to the default DMRS pattern in a predetermined time-frequency resource region. Hereinafter, a DMRS pattern including additional DMRS REs other than DMRS REs corresponding to the default DMRS pattern will be referred to as an additional DMRS pattern. The additional DMRS pattern may be UE-specifically determined. For example, a default DMRS pattern as illustrated in FIG. 16(a) may be present and a DMRS having a higher density may be used by transmitting an additional DMRS in 8 REs in addition to DMRS REs of the default DMRS pattern as illustrated in FIG. 16(b).

In relation to an additional DMRS pattern for multiple densities, a DMRS pattern having a higher density, i.e. a DMRS pattern having a greater number of DMRS REs may be configured to include a DMRS pattern having a lower density, i.e. a DMRS pattern having a less number of DMRS REs.

The default DMRS can be used in RB(s) in which a cell-specific signal (e.g. a CSS, a PBCH, an SIB, or a PDSCH scheduled by a PDCCH in the CSS) is transmitted. Alternatively, the default DMRS can be used in RB(s) in which a random access response (RAR), a PDSCH for an RRC signal, an EPDCCH, a PDSCH for which SPS based scheduling is configured, or a PDSCH for retransmission is transmitted.

The additional DMRS that is transmitted together with the default DMRS may be used in a time-frequency resource region (e.g. a PDSCH or a PUSCH) in which UE-specific data or a UE-specific signal is transmitted. Since a USS is UE-specific, the additional DMRS may be used in the USS. Notably, considering that it is difficult to inform the UE of the additional DMRS pattern at a timing when a DMRS is applied to an (e)PDCCH, it is desirable to use a cell-specific DMRS using only the default DMRS in the USS. The eNB may inform the UE of the additional DMRS pattern through an RRC signal or the (e)PDCCH. The eNB may directly inform the UE of an RE location of the additional DMRS. For example, when N prescheduled additional DMRS RE locations are present and the eNB desires to additionally use K DMRS REs, the eNB may inform the UE of index(es) of locations of the K REs to be used for additional DMRS among indexes from 0 to N−1. Alternatively, the eNB may inform the UE of DMRS RE(s) to be used for the additional DMRS among the N DMRS RE locations by a bitmap scheme. Alternatively, the eNB may inform the UE of an index of one pattern to be used among P predefined additional DMRS pattern(s) in order to inform the UE of the additional DMRS pattern. For example, the UE may use a default DMRS when a bit value of a 1-bit field transmitted through a PDCCH is 0 and use an additional DMRS pattern when the bit value is 1. As another example, the UE may acquire additional DMRS pattern information through a field explicitly added to the (e)PDCCH. Alternatively, the UE may acquire the additional DMRS pattern information through an already existing specific bit or specific field of the (e)PDCCH. Alternatively, the UE may implicitly acquire the additional DMRS pattern information according to a state value of one or multiple already existing fields of the (e)PDCCH.

In the case of a DMRS used for PUSCH transmission/reception in a UL environment using a normal CP, the eNB may inform the UE, using a bitmap, of whether each of 7 symbols in one slot is used for DMRS transmission. Alternatively, referring to FIG. 11, a default DMRS may be transmitted on symbol #3 as in the same manner as conventional DMRS transmission and whether each of the other symbols #0, #1, #2, #4, #5, and #6 is used for DMRS transmission may be transmitted/received using a bitmap. In the case of the DMRS used for PUSCH transmission/reception in the UL environment using the normal CP, the eNB may inform the UE, using a bitmap, of whether each of 14 symbols in one subframe is used for DMRS transmission. Alternatively, the default DMRS may be transmitted through symbols #3 and #10 as in conventional DMRS transmission and the eNB may inform the UE, using a bitmap, of whether each of symbols other than symbols #3 and #10 is used for DMRS transmission. In this case, a DMRS pattern in which a DMRS is present only in one slot of two slots of one subframe may be used only when inter-slot PUSCH hopping is not applied. Alternatively, the UE may assume that an existing/default DMRS pattern is applied when PUSCH hopping is applied. This is because, channel estimation performed with a DMRS received in an RB of a previous slot cannot be determined to be valid even in an RB of the next slot having no DMRS since a frequency resource used for PUSCH transmission differs according to a slot when inter-slot PUSCH hopping is applied. If the DMRS is transmitted/received using only one of symbols of one subframe, the last symbol (symbol #6) of the first slot may be used for DMRS transmission/reception. This is because locating a DMRS in the center of one subframe may be helpful in performing channel estimation evenly over the subframe.

Use of such a default DMRS pattern has the advantage of enabling operation even when a DMRS pattern that is to be used by the UE is obscure. For example, when a CC on which the UE operates is changed or the DMRS pattern is reconfigured, timing intervals during which a DMRS pattern prior to CC change and a DMRS pattern after CC change are applied are obscure may occur in terms of the UE. In these intervals, if the eNB transmits a DMRS using only the default DMRS pattern regardless of a DMRS pattern configured for a corresponding UE, the UE may perform demodulation using only a pre-known default DMRS location. In this case, the eNB may transmit additional DMRS REs by puncturing a DMRS sequence in order to transmit the default DMRS to the UE. In other words, sequence part(s) mapped to additional DMRS RE(s) among DMRS sequences mapped to REs of the additional DMRS pattern may be punctured. The eNB may use REs of the punctured DMRS to transmit data. The eNB may configure whether to use the REs of the punctured DMRS to transmit data.

As another method for configuring DMRS patterns having multiple densities, a default DMRS pattern may be configured first and then the default DMRS may be punctured in order to lower a DMRS density.

Figure 17:
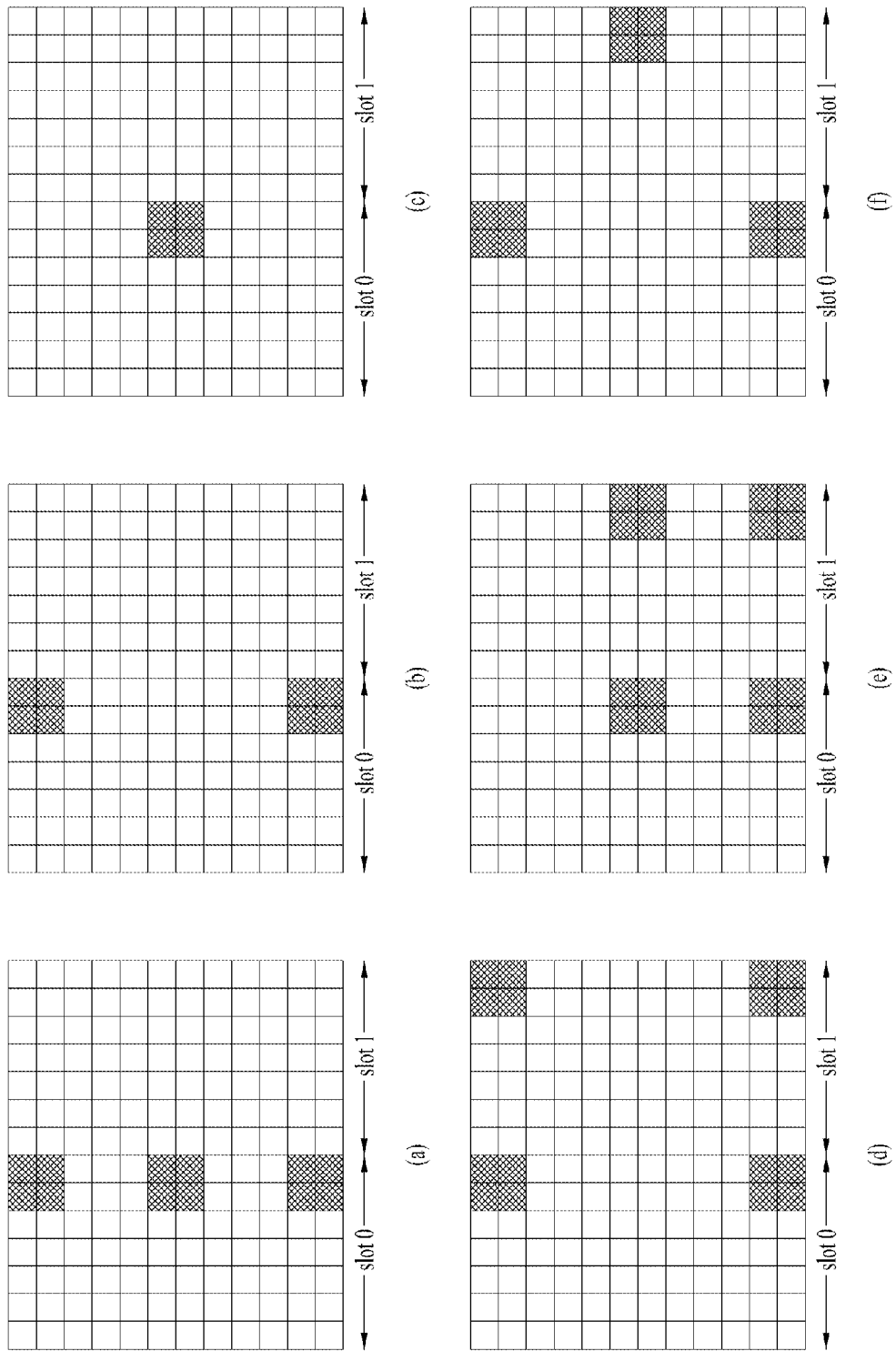
FIGS. 17(a), (b), (c), (d), (e), and (f) illustrate demodulation reference signal (DMRS) patterns according to another embodiment of the present invention.

FIG. 17 illustrates DMRS patterns according to another embodiment of the present invention.

For example, when a default DMRS is present as illustrated in FIG. 16(a), a DMRS having a lower density may be used by not transmitting some REs of the default DMRS as illustrated in FIG. 17. In other words, a DMRS pattern having a lower density than the default DMRS pattern may be configured by puncturing part(s) mapped to some DMRS REs among DMRS sequences mapped to DMRS REs of the default DMRS pattern. For example, a punctured DMRS pattern may be acquired as illustrated in FIG. 17(a) by puncturing a DMRS that is present in or is mapped to some OFDM symbol(s). Notably, the DMRS pattern illustrated in FIG. 17(a) can be applied only when the UE uses a maximum of four antenna ports. Alternatively, punctured DMRS patterns may be acquired as illustrated in FIG. 17(d) and FIG. 17(e) by puncturing the default DMRS that is present in or is mapped to some frequency regions. Especially, for example, the UE may obtain information about a punctured DMRS pattern through a field explicitly added to an (e)PDCCH. Alternatively, the UE may obtain the information about the punctured DMRS pattern through a value of an already existing specific bit or specific field of the (e)PDCCH. Alternatively, the UE may implicitly obtain the information about the punctured DMRS patterns through a state value of one or multiple already existing fields of the (e)PDCCH. As another example, as illustrated in FIG. 17(b) or FIG. 17(c), a punctured DMRS pattern may be obtained by puncturing a default DMRS that is present in some frequency regions and some OFDM symbols. In other words, a part of DMRS sequences mapped to RE(s) that are present in some frequency region and some OFDM symbols among DMRS REs of the default DMRS pattern may be punctured. As another example, as illustrated in FIG. 17(f), a punctured DMRS pattern may be obtained by puncturing a default DMRS that is present in or is mapped to some RE(s). The punctured DMRS pattern is different from an additional DMRS pattern defined to further include DMRS REs in addition to all DMRS REs of the default DMRS pattern in that the punctured DMRS pattern is defined only by some DMRS REs among DMRS REs of the default DMRS pattern.

In association with DMRS puncturing patterns having multiple densities, a DMRS puncturing pattern having a lower DMRS density, i.e., a DMRS puncturing pattern having more punctured REs may be configured to include a DMRS puncturing pattern having a higher DMRS density, i.e., a DMRS puncturing pattern having less punctured REs.

A DMRS puncturing pattern used by puncturing the default DMRS may be UE-specifically determined. A DMRS obtained by puncturing the default DMRS may be used in a time-frequency resource region (e.g. a PDSCH or a PUSCH) in which UE-specific data or a UE-specific signal is transmitted. Since a USS is UE-specific, the present embodiment in which the DMRS is punctured may be used in the USS. However, when the case in which it is difficult for the eNB to inform the UE of the DMRS puncturing pattern at a timing when the DMRS is used in the (e)PDCCH is considered, it is desirable to cell-specifically transmit/receive the DMRS by using the default DMRS pattern. In this case, the eNB may inform the UE of a default DMRS puncturing pattern through an RRC signal or an (e)PDCCH. The eNB may directly inform the UE of location(s) of RE(s) to be punctured in a predetermined time-frequency resource region. For example, when N prescheduled DMRS puncturing RE location(s) are present and K DMRS REs are desired to be punctured, the eNB may inform the UE of location(s) of K REs to be punctured among indexes from 0 to N−1. Alternatively, when N prescheduled DMRS puncturing RE location(s) are present, the eNB may inform the UE of location(s) of RE(s) to be punctured among the N DMRS puncturing RE location(s) by a bitmap scheme. Alternatively, the eNB may inform the UE of an index for one DMRS puncturing pattern to be used among P predefined DMRS puncturing pattern(s) in order to inform the UE of DMRS RE location(s) to be punctured. In particular, for example, if a value of a bit of a 1-bit field transmitted through a PDCCH is 0, the UE may use a default DMRS and, if the value of the bit is 1, the UE may use a punctured DMRS.

In the case of a DMRS used for PUSCH transmission/reception in a UL environment using a normal CP, the default DMRS may be transmitted through symbols #3 and #10 in one subframe like conventional DMRS transmission. Alternatively, for DMRS puncturing, the eNB may inform the UE of which symbol(s) of the two symbols—symbols #3 and #10—will be used or will not be used for DMRS transmission by a bitmap scheme. DMRS puncturing for a PUSCH in the UL environment may be used only when inter-slot PUSCH hopping is not applied. This is because, if inter-slot PUSCH hopping is configured, since a frequency resource used for PUSCH transmission varies with a slot, channel estimation performed with a DMRS received in an RB of a previous slot cannot be determined to be valid even in an RB of the next slot having no DMRS. The UE may assume that an existing/default DMRS pattern is applied when PUSCH hopping is applied.

The eNB may use an RE of a punctured DMRS to transmit data. The eNB may configure whether to use the RE of the punctured DMRS to transmit data.

Figure 18:
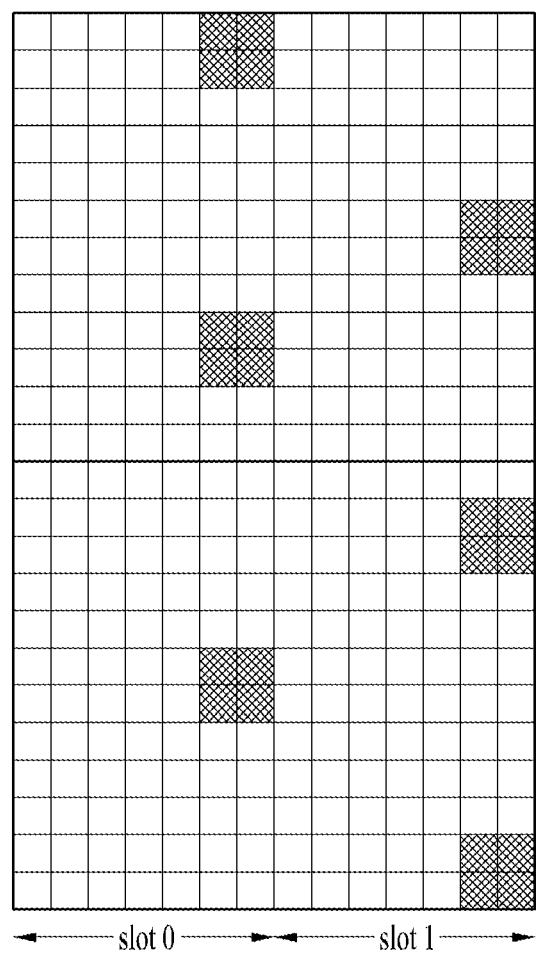
FIGS. 18 and 19 illustrate demodulation reference signal (DMRS) patterns according to still another embodiment of the present invention.
Figure 19:
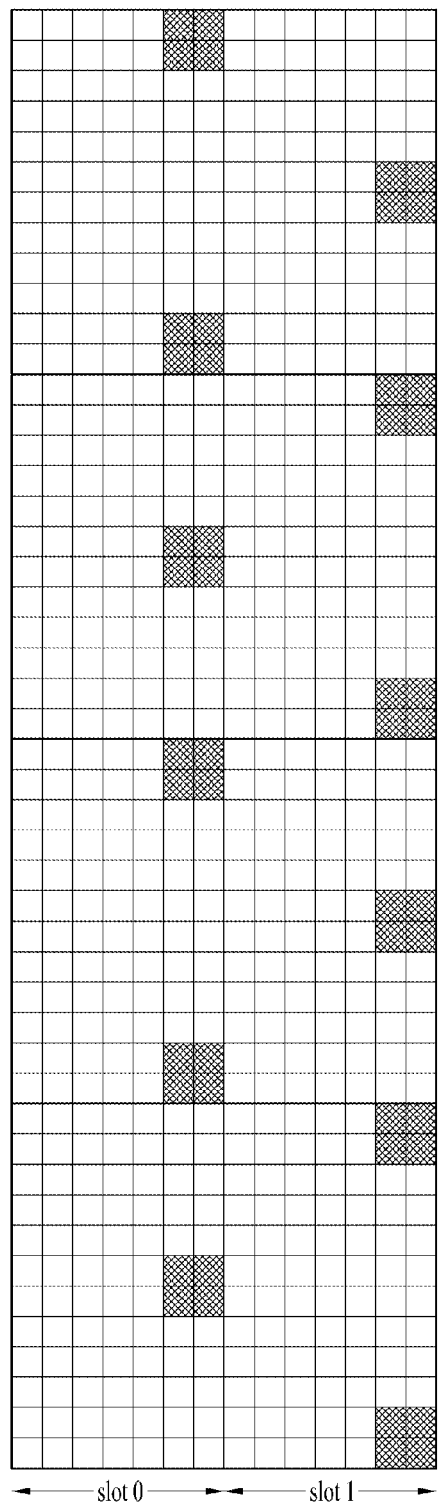

FIGS. 18 and 19 illustrate DMRS patterns according to still another embodiment of the present invention.

In the present invention, a DMRS pattern may be defined as one RB unit and the same or different DMRS pattern may be applied per RB. Alternatively, in the present invention, the DMRS pattern may be defined in the unit of one PRB bundle and the same or different DMRS pattern may be applied per PRB bundle. For example, a DMRS pattern for two PRBs may be configured with respect to a specific UE as illustrated in FIG. 18 and the DMRS pattern illustrated in FIG. 18 may be used for two PRB bundles of a PDSCH region transmitted to the UE.

Alternatively, when a specific DMRS pattern is present and the DMRS pattern is referred to as PT_A, K DMRS pattern(s) PT_A_1, PT_A_2, . . . , and PT_A_K consisting of some RE locations among RE locations constituting PT_A may be present. In this case, REs constituting PT_A_1, PT_A_2, . . . , and PT_A_K do not overlap and PT_A_1, PT_A_2, . . . , and PT_A_K in which the REs constituting PT_A_1, PT_A_2, . . . , and PT_A_K are equal in sum to REs constituting PT_A may be defined or configured. For a DMRS transmitted through RB(s) to which a PDSCH/PUSCH is mapped, K DMRS pattern(s) of PT_A_1, PT_A_2, . . . , and PT_A_K may be alternately transmitted in the unit of a PRB.

Alternatively, two DMRS patterns PT_A_1 and PT_A_2 consisting of some REs (or RE locations) among REs (or RE locations) constituting PT_A may be included wherein REs constituting PT_A_1 and PT_A_2 do not overlap and PT_A_1 and PT_A_2 in which the REs constituting PT_A_1 and PT_A_2 are equal in sum to the REs (or RE locations) constituting PT_A may be defined or configured. In a DMRS pattern transmitted for the PDSCH/PUSCH, DMRS patterns of PT_A_1 and PT_A_2 may be alternately transmitted in the unit of a PRB. For example, two DMRS patterns may be alternately transmitted in the unit of an RB as illustrated in FIG. 19. In this case, DMRS REs constituting a DMRS pattern used in an odd-numbered RB may not overlap with DMRS REs constituting a DMRS pattern used in an even-numbered RB. The two DMRS patterns may be configured such that DMRS REs constituting the two DMRS patterns are equal in sum to DMRS REs constituting a DMRS pattern having the highest density among DMRS patterns that can be used for the UE.

In consideration of RRC reconfiguration, backward compatibility, control overhead, etc. in a DL environment, a default DMRS may always be applied or DMRS reduction/increase may not be applied in RB(s) in which a control/data signal/channel shown below is transmitted. Alternatively, the UE may assume that the default DMRS is always applied or DMRS decrease/increase is not applied in a region in which the following control/data signal/channel is transmitted even when DMRS decrease/increase is configured.

CSS, PBCH (MIB), SIB
RAR, PDSCH for RRC signal, EPDCCH
PDSCH scheduled from CSS
PDSCH in which SPS based scheduling is configured
PDSCH for which retransmission is performed, i.e. PDSCH carrying a retransmission signal/data B. RS Transmission Method During Collision of DMRS and TRS DMRS Puncturing When a TRS and a DMRS are simultaneously transmitted in an NCT, an RE in which a TRS is transmitted and an RE in which a DMRS is transmitted may overlap in a specific RB or a specific subframe. That is, REs on which TRS transmission and DMRS transmission collide may be present.

Thus, if transmission locations of the TRS and the DMRS collide, the eNB may transmit the TRS after puncturing the DMRS of an RE on which transmission locations of the TRS and the DMRS collide. Alternatively, the eNB may transmit only the TRS after puncturing the DMRS in all RBs in which transmission locations of the TRS and the DMRS collide.

If the DMRS is punctured due to collision of the transmission locations of the TRS and the DMRS, the eNB may additionally transmit a DMRS RE for a UE that is subjected to a problem of data reception caused by insufficient DMRS REs. In this case, the additionally transmitted DMRS is located on an RE that does not overlap with an RE of the TRS. Because all UEs are not always subjected to a problem in operation due to puncturing of the DMRS, the additional DMRS may be UE-specifically transmitted.

TRS Puncturing

If transmission locations of the TRS and the DMRS collide, the eNB may transmit the DMRS after puncturing the TRS of an RE on which the transmission locations of the TRS and DMRS collide. Alternatively, the eNB may transmit only the DMRS after puncturing the TRS in all RBs in which the transmission locations of the TRS and the DMRS collide.

In particular, puncturing of the TRS when transmission locations of the TRS and the DMRS collide may be performed only in RB(s) in which a cell-specific signal is transmitted. Alternatively, puncturing of the TRS when the transmission locations of the TRS and the DMRS collide may be performed only in RB(s) in which a cell-specific DMRS is transmitted. In this case, the UE may use the DMRS for tracking.

The above-described present invention may be used in machine type communication (MTC) as well as in a small cell or a high frequency band. MTC refers to information exchange performed between a machine and an eNB without human intervention or with minimal human intervention. For example, MTC may be used for data communication of measurement/sensing/reporting such as meter reading, water level measurement, use of a surveillance camera, and inventory reporting of a vending machine and may also be used for an automatic application or a firmware update process for multiple UEs sharing a predetermined characteristic. In the case of MTC, there is little transmission data, there are many UEs that operate in one cell, and UEs have low mobility. Therefore, the present invention in which various RS densities can be configured may be applied even to an MTC UE having characteristics of low mobility.

The eNB processor of the present invention may configure one of multiple DMRS patterns for the UE according to any one of embodiments of the present invention. The multiple DMRS patterns may differ in at least ones of DMRS densities and DMRS RE locations. For example, even when REs of the same number are occupied by a DMRS in a predetermined time-frequency resource region, if REs occupied by the DMRS differ, the REs may constitute different DMRS patterns. As another example, even when REs occupied by the DMRS are substantially the same, a DMRS pattern that includes additional RE(s) occupied by the DMRS or includes REs in which the DMRS is punctured may correspond to a DMRS pattern different from a basic DMRS pattern (i.e. default DMRS pattern). The present invention may be configured such that an additional DMRS pattern in which additional DMRS REs are added to the default DMRS pattern include a punctured DMRS pattern in which some of DMRS REs of the default DMRS pattern are punctured. For example, DMRS REs of the additional DMRS pattern include REs of the default DMRS pattern and DMRS REs of the default DMRS pattern includes REs of the punctured DMRS pattern. The default DMRS pattern may be cell-specifically determined.

The eNB processor may control the eNB RF unit so that a DMRS pattern for PUSCH, PDSCH, or EPDCCH transmission may be UE-specifically or cell-specifically configured and information indicating a DMRS pattern relating to PUSCH, PDSCH, or EPDCCH transmission may be transmitted. The UE RF unit receives information indicating one of multiple DMRS patterns that differ in at least ones of DMRS densities and DMRS RE locations sand transmits the received information to the UE processor.

The eNB processor may control the eNB RF unit so that related DMRS(s) may be transmitted together with DL data or a DL control signal in RB(s) to which a PDSCH or an EPDCCH (hereinafter, PDSCH/EPDCCH) is mapped. The eNB processor controls the eNB RF unit so that DMRS(s) may be transmitted according to the indicated DMRS pattern. The eNB processor may apply the same precoder 304 to the DL signal and the DMRS(s). The UE RF unit receives the related DMRS(s) together with PDSCH/EPDCCH transmission in RB(s) to which the PDSCH/EPDCCH is mapped. Since the UE RF unit receives information indicating a DMRS pattern for the PDSCH/EPDCCH, the UE processor may detect the DMRS(s) according to the indicated DMRS pattern. Since a precoder that is the same as a precoder applied to an associated DL signal is applied to the DMRS(s), the UE processor may demodulate the DL signal using the DMRS(s) according to the indicated DMRS pattern even when information about a precoder applied to the DL signal is not additionally received.

Meanwhile, in UL, a UE RF unit may receive the information indicating the DMRS pattern associated with PUSCH transmission and a UE processor may control the UE RF unit so that a DMRS for a PUSCH according to the DMRS pattern indicated by the information may be transmitted in a PUSCH region together with the PUSCH. The eNB processor is aware of which DMRS pattern is used for PUSCH transmission and is aware of in which subframe the PUSCH and the DMRS should be received through RB(s) because PUSCH transmission is scheduled through the PDCCH. Accordingly, the eNB processor may demodulate a UL signal over the PUSCH by detecting a DMRS for the PUSCH configured by the eNB processor according to the DMRS pattern.

DMRS patterns having different DMRS densities according to the present invention can be predefined and can be shared by the UE and the eNB.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:
1. A method for receiving a downlink signal by a user equipment, the method comprising:
obtaining, by the user equipment, first indication information indicating a first demodulation reference signal (DMRS) configuration from among a plurality of DMRS configurations defined for DMRS transmission;
receiving, by the user equipment, a DMRS for the user equipment in a time-frequency resource region, to which the downlink signal for the user equipment is mapped, according to the first DMRS configuration indicated by the first indication information;
demodulating, by the user equipment, the downlink signal using the DMRS;
obtaining, by the user equipment, second indication information indicating that the first DMRS configuration is to be switched with a second DMRS configuration; and
using, by the user equipment, a default DMRS configuration during a time interval when it is unclear whether to use the first DMRS configuration or the second DMRS configuration,
wherein the plurality of DMRS configurations differ in a density of the DMRS,
wherein the plurality of DMRS configurations include the default DMRS configuration, and at least a DMRS configuration of a lower density than a density of the default DMRS configuration or a DMRS configuration of a higher density than the density of the default DMRS configuration, and
wherein the DMRS configuration of the lower density is defined to include only some resource elements (REs) for the DMRS among DMRS REs of the default DMRS configuration and the DMRS configuration of the higher density is defined to include predetermined DMRS REs in addition to the DMRS REs of the default DMRS configuration.

2. The method according to claim 1,
wherein the time-frequency resource region includes a plurality of physical resource blocks and at least one of the plurality of DMRS configurations is defined to include the DMRS only in some of the plurality of physical resource blocks.

3. A user equipment for receiving a downlink signal, the user equipment comprising:
a radio frequency (RF) unit; and
a processor that:
obtains first indication information indicating a first demodulation reference signal (DMRS) configuration from among a plurality of DMRS configurations defined for DMRS transmission;
controls the RF unit to receive a DMRS for the user equipment in a time-frequency resource region, to which the downlink signal for the user equipment is mapped, according to the first DMRS configuration indicated by the first indication information;
demodulates the downlink signal using the DMRS;
obtains second indication information indicating that the first DMRS configuration is to be switched with a second DMRS configuration; and
uses a default DMRS configuration during a time interval when it is unclear whether to use the first DMRS configuration or the second DMRS configuration
wherein the plurality of DMRS configurations differ in a density of the DMRS,
wherein the plurality of DMRS configurations include the default DMRS configuration, and at least a DMRS configuration of a lower density than a density of the default DMRS configuration or a DMRS configuration of a higher density than the density of the default DMRS configuration, and wherein the DMRS configuration of the lower density is defined to include only some resource elements (REs) for the DMRS among DMRS REs of the default DMRS configuration and the DMRS configuration of the higher density is defined to include predetermined DMRS REs in addition to the DMRS REs of the default DMRS configuration.

4. The user equipment according to claim 3, wherein the time-frequency resource region includes a plurality of physical resource blocks and at least one of the plurality of DMRS configurations is defined to include the DMRS only in some of the plurality of physical resource blocks.

5. A method for transmitting a downlink signal by a base station, the method comprising:

transmitting, by the base station, first indication information indicating a first demodulation reference signal (DMRS) configuration from among a plurality of configurations for DMRS transmission;

transmitting, by the base station, a DMRS for a user equipment in a time-frequency resource region, to which the downlink signal for the user equipment is mapped, according to the DMRS configuration indicated by the first indication information;

transmitting, by the base station, second indication information indicating that the first DMRS configuration is to be switched with a second DMRS configuration; and transmitting, by the base station, a default DMRS configuration during a time interval when it is unclear whether to use the first DMRS configuration or the second DMRS configuration, wherein the plurality of DMRS configurations differ in a density of the DMRS, wherein the plurality of DMRS configurations include the default DMRS configuration, and at least a DMRS configuration of a lower density than a density of the default DMRS configuration or a DMRS configuration of a higher density than the density of the default DMRS configuration, and wherein the DMRS configuration of the lower density is defined to include only some resource elements (REs) for the DMRS among DMRS REs of the default DMRS configuration and the DMRS configuration of the higher density is defined to include predetermined DMRS REs in addition to the DMRS REs of the default DMRS configuration.

6. The method according to claim 5, wherein the time-frequency resource region includes a plurality of physical resource blocks and at least one of the plurality of DMRS configurations is defined to include the DMRS only in some of the plurality of physical resource blocks.

7. A base station for transmitting a downlink signal, the base station comprising:

a radio frequency (RF) unit; and a processor that:

controls the RF unit to transmit first indication information indicating a first demodulation reference signal (DMRS) configuration from among a plurality of configurations for DMRS transmission;

controls the RF unit to transmit a DMRS for a user equipment in a time-frequency resource region, to which the downlink signal for the user equipment is mapped, according to the first DMRS configuration indicated by the first indication information;

controls the RF unit to transmit second indication information indicating that the first DMRS configuration is to be switched with a second DMRS configuration; and controls the RF unit to transmit a default DMRS configuration during a time interval when it is unclear whether to use the first DMRS configuration or the second DMRS configuration, wherein the plurality of DMRS configurations differ in a density of the DMRS, wherein the plurality of DMRS configurations include the default DMRS configuration, and at least a DMRS configuration of a lower density than a density of the default DMRS configuration or a DMRS configuration of a higher density than the density of the default DMRS configuration, and wherein the DMRS configuration of the lower density is defined to include only some resource elements (REs) for the DMRS among DMRS REs of the default DMRS configuration and the DMRS configuration of the higher density is defined to include predetermined DMRS REs in addition to the DMRS REs of the default DMRS configuration.

8. The base station according to claim 7, wherein the time-frequency resource region includes a plurality of physical resource blocks and at least one of the plurality of DMRS configurations is defined to include the DMRS only in some of the plurality of physical resource blocks.

* * * * *